United States Patent
Pilebro et al.

(10) Patent No.: US 9,709,337 B2
(45) Date of Patent: Jul. 18, 2017

(54) ARRANGEMENT FOR STORING THERMAL ENERGY

(75) Inventors: Hans Pilebro, Enebyberg (SE); Hakan Eg Andersson, Taby (SE)

(73) Assignee: SKANSKA SVERIGE AB, Solna (SE)

( * ) Notice: Subject to any disclaimer, the term of this patent is extended or adjusted under 35 U.S.C. 154(b) by 0 days.

(21) Appl. No.: 13/388,648

(22) PCT Filed: Jul. 12, 2010

(86) PCT No.: PCT/SE2010/050808
§ 371 (c)(1),
(2), (4) Date: Feb. 2, 2012

(87) PCT Pub. No.: WO2011/016768
PCT Pub. Date: Feb. 10, 2011

(65) Prior Publication Data
US 2012/0132393 A1 May 31, 2012

(30) Foreign Application Priority Data

Aug. 3, 2009 (SE) .................................. 0950576

(51) Int. Cl.
*F28D 20/00* (2006.01)
*F28D 7/02* (2006.01)

(52) U.S. Cl.
CPC ............ *F28D 20/0052* (2013.01); *F28D 7/02* (2013.01); *Y02E 60/142* (2013.01); *Y10T 29/49718* (2015.01)

(58) Field of Classification Search
USPC ................................................ 165/4, 10, 45
See application file for complete search history.

(56) References Cited

U.S. PATENT DOCUMENTS 2,724,954 A * 11/1955 Maetz ................................ 165/4
2,793,509 A * 5/1957 Keen ................................ 165/45
(Continued)

FOREIGN PATENT DOCUMENTS

CN 102077050 5/2011
CN 102483311 5/2012
(Continued)

OTHER PUBLICATIONS

Turner, J. S. et al., "Beyond Biomimicry: What termites can tell us about realizing the living building." First International Conference on Industrialized, Intelligent Construction, May 2008. [online] [retrieved Apr. 5, 2015]. Retrieved from internet: <URL:http://www.esf.edu/efb/turner/publication%20pdfs/Beyond%20Biomimicry%20MS%20distribution.pdf>.*

(Continued)

*Primary Examiner* — Ljiljana Ciric
(74) *Attorney, Agent, or Firm* — Tucker Ellis, LLP; Patrick Clunk

(57) ABSTRACT

An arrangement for storing thermal energy, having at least one subterranean chamber for holding a first fluid is provided. A passage holding a second fluid is extended outside at least a part of the chamber. At least one channel is arranged to allow fluid communication of the first fluid between different sections of the chamber, and/or allow fluid communication of the second fluid between different sections of the passage.

20 Claims, 8 Drawing Sheets

(56) References Cited

U.S. PATENT DOCUMENTS

| | | | | |
|---|---|---|---|---|
| 3,217,791 A * | 11/1965 | Long | E02D 3/115 | |
| | | | 165/104.21 | |
| 3,348,883 A * | 10/1967 | Jacoby | E21B 43/281 | |
| | | | 159/902 | |
| 3,392,530 A * | 7/1968 | Brandt | E21F 17/16 | |
| | | | 405/56 | |
| 3,411,574 A * | 11/1968 | De Vries et al. | 165/10 | |
| 3,492,461 A * | 1/1970 | Lawrence | 165/10 | |
| 3,563,304 A * | 2/1971 | McGrath | 165/45 | |
| 3,580,330 A | 5/1971 | Maugis | | |
| 3,653,429 A * | 4/1972 | Lawrence | 165/10 | |
| 3,658,123 A * | 4/1972 | Root | F24F 3/06 | |
| | | | 165/207 | |
| 3,661,424 A * | 5/1972 | Jacoby | E21B 43/281 | |
| | | | 159/902 | |
| 3,722,445 A * | 3/1973 | Karig et al. | 165/10 | |
| 3,747,907 A * | 7/1973 | Anderson | F28C 3/06 | |
| | | | 165/104.31 | |
| 3,757,516 A | 9/1973 | McCabe | | |
| 3,786,858 A * | 1/1974 | Potter | F24D 12/00 | |
| | | | 165/45 | |
| 3,807,491 A | 4/1974 | Van Hulsen | | |
| 3,817,038 A | 6/1974 | Paull | | |
| 3,848,427 A * | 11/1974 | Loofbourow | F17C 3/005 | |
| | | | 137/236.1 | |
| 3,851,495 A * | 12/1974 | Lahoud | F01K 9/003 | |
| | | | 165/45 | |
| 3,857,244 A | 12/1974 | Faucette | | |
| 3,863,709 A | 2/1975 | Fitch | | |
| 3,908,753 A * | 9/1975 | Balch | F28D 15/00 | |
| | | | 165/104.31 | |
| 3,939,356 A | 2/1976 | Loane | | |
| 3,943,722 A | 3/1976 | Ross | | |
| 3,952,519 A * | 4/1976 | Watson | 60/641.8 | |
| 3,953,971 A * | 5/1976 | Parker | F03G 7/04 | |
| | | | 165/45 | |
| 3,955,554 A * | 5/1976 | Collie | 126/586 | |
| 3,965,972 A | 6/1976 | Petersen | | |
| 3,967,448 A * | 7/1976 | Matthews | 165/45 | |
| 3,986,339 A | 10/1976 | Janelid | | |
| 3,986,362 A | 10/1976 | Baciu | | |
| 3,991,817 A * | 11/1976 | Clay | E21B 7/00 | |
| | | | 165/45 | |
| 3,993,122 A * | 11/1976 | Svenstam | 165/45 | |
| 4,008,709 A * | 2/1977 | Jardine | 165/45 | |
| 4,010,731 A * | 3/1977 | Harrison | 126/620 | |
| 4,011,736 A * | 3/1977 | Harrison | 165/10 | |
| 4,018,279 A * | 4/1977 | Reynolds et al. | 165/45 | |
| 4,024,910 A * | 5/1977 | Werner | 165/45 | |
| 4,030,549 A | 6/1977 | Bouck | | |
| 4,037,650 A * | 7/1977 | Randall | 165/10 | |
| 4,040,480 A * | 8/1977 | Richards | 165/45 | |
| 4,047,093 A | 9/1977 | Levoy | | |
| 4,054,176 A * | 10/1977 | Van Huisen | F03G 7/04 | |
| | | | 165/45 | |
| 4,059,959 A * | 11/1977 | Matthews | 165/45 | |
| 4,060,988 A | 12/1977 | Arnold | | |
| 4,063,546 A * | 12/1977 | Schmid et al. | 165/10 | |
| 4,089,373 A * | 5/1978 | Reynolds et al. | 165/45 | |
| 4,091,863 A * | 5/1978 | Schroder | 165/104.11 | |
| 4,095,429 A * | 6/1978 | Morey | F03G 6/00 | |
| | | | 60/641.6 | |
| 4,117,882 A * | 10/1978 | Shurcliff | 165/10 | |
| 4,119,086 A * | 10/1978 | Brussels | 126/590 | |
| 4,119,143 A * | 10/1978 | Robinson, Jr. | 165/10 | |
| 4,121,429 A | 10/1978 | Grennard | | |
| 4,137,720 A | 2/1979 | Rex | | |
| 4,138,995 A * | 2/1979 | Yuan | 126/620 | |
| 4,139,056 A | 2/1979 | Scholl | | |
| 4,139,321 A * | 2/1979 | Werner | 405/154.1 | |
| 4,142,576 A * | 3/1979 | Perry et al. | 165/45 | |
| 4,147,204 A * | 4/1979 | Pfenninger | 165/4 | |
| 4,149,389 A * | 4/1979 | Hayes | | |
| 4,150,547 A * | 4/1979 | Hobson | 165/45 | |
| 4,153,047 A * | 5/1979 | Dumbeck | 165/10 | |
| 4,154,292 A * | 5/1979 | Herrick | 165/10 | |
| 4,157,730 A | 6/1979 | Despois | | |
| 4,158,384 A * | 6/1979 | Brautigam | 165/10 | |
| 4,159,736 A * | 7/1979 | Denis | E03B 1/02 | |
| | | | 126/400 | |
| 4,165,945 A | 8/1979 | Despois et al. | | |
| 4,174,009 A | 11/1979 | Laing et al. | | |
| 4,187,686 A * | 2/1980 | Pommier | F01K 27/005 | |
| | | | 60/641.6 | |
| 4,187,690 A * | 2/1980 | Lindahl | 165/61 | |
| 4,192,146 A * | 3/1980 | Crede | 165/104.11 | |
| 4,194,496 A * | 3/1980 | Carlson | 165/10 | |
| 4,194,856 A | 3/1980 | Jahns | | |
| 4,199,021 A * | 4/1980 | Thoma | 165/10 | |
| 4,200,152 A | 4/1980 | Foster | | |
| 4,203,489 A * | 5/1980 | Swiadek | 165/10 | |
| 4,211,613 A | 7/1980 | Meckler | | |
| 4,219,072 A * | 8/1980 | Barlow, Sr. | 165/10 | |
| 4,219,074 A * | 8/1980 | Hansen | 165/45 | |
| 4,223,729 A | 9/1980 | Foster | | |
| 4,234,037 A | 11/1980 | Rogers | | |
| 4,234,782 A * | 11/1980 | Barabas et al. | 165/10 | |
| 4,240,268 A * | 12/1980 | Yuan | 165/10 | |
| 4,241,724 A | 12/1980 | Hull | | |
| 4,241,781 A * | 12/1980 | Eschner et al. | 165/10 | |
| 4,246,466 A * | 1/1981 | Rice et al. | 392/341 | |
| 4,250,958 A * | 2/1981 | Wasserman | 165/10 | |
| 4,253,801 A * | 3/1981 | O'Hare | F24D 11/007 | |
| | | | 126/569 | |
| 4,257,556 A * | 3/1981 | Skala | 165/10 | |
| 4,258,780 A * | 3/1981 | Suo | 165/45 | |
| 4,262,735 A * | 4/1981 | Courrege et al. | 165/4 | |
| 4,262,739 A * | 4/1981 | Gruen et al. | 165/48.2 | |
| 4,263,961 A * | 4/1981 | Morawetz et al. | 165/10 | |
| 4,265,224 A * | 5/1981 | Meyer | 126/572 | |
| 4,267,881 A * | 5/1981 | Byerly | 165/45 | |
| 4,270,282 A * | 6/1981 | Lotz | 165/10 | |
| 4,270,512 A * | 6/1981 | Van Der Maas | 165/10 | |
| 4,270,523 A * | 6/1981 | van Heel | 165/10 | |
| 4,270,600 A * | 6/1981 | Bourdin | 165/45 | |
| 4,271,681 A | 6/1981 | Schertz | | |
| 4,280,483 A * | 7/1981 | Schaffer | 165/10 | |
| 4,280,553 A * | 7/1981 | Bean et al. | 165/104.17 | |
| 4,285,389 A * | 8/1981 | Horton | 126/639 | |
| 4,286,574 A * | 9/1981 | Vrolyk et al. | 165/10 | |
| 4,287,942 A * | 9/1981 | Whitman | 165/10 | |
| 4,290,266 A | 9/1981 | Twite | | |
| 4,291,750 A * | 9/1981 | Clyne et al. | 165/10 | |
| 4,291,751 A | 9/1981 | Wolf | | |
| 4,297,847 A | 11/1981 | Clayton | | |
| 4,305,381 A * | 12/1981 | Misrahi et al. | 165/10 | |
| 4,306,416 A * | 12/1981 | Iozzi | F01K 27/005 | |
| | | | 60/641.11 | |
| 4,306,613 A * | 12/1981 | Christopher | 165/10 | |
| 4,323,113 A * | 4/1982 | Troyer | 165/45 | |
| 4,324,289 A * | 4/1982 | Lahti | 165/10 | |
| 4,346,569 A * | 8/1982 | Yuan | 165/10 | |
| 4,349,228 A * | 9/1982 | Rohde | E21F 16/00 | |
| | | | 166/50 | |
| 4,351,651 A | 9/1982 | Courneya | | |
| 4,361,135 A * | 11/1982 | Metz | 126/640 | |
| 4,362,149 A * | 12/1982 | Thomson | 126/643 | |
| 4,366,856 A * | 1/1983 | Yanadori et al. | 165/10 | |
| 4,369,635 A * | 1/1983 | Lambert | 165/45 | |
| 4,371,029 A * | 2/1983 | Lindner et al. | 165/10 | |
| 4,373,573 A * | 2/1983 | Madwed | 165/45 | |
| 4,375,157 A | 3/1983 | Boesen | | |
| 4,375,831 A * | 3/1983 | Downing, Jr. | 165/45 | |
| 4,378,908 A * | 4/1983 | Wood | 126/570 | |
| 4,384,569 A * | 5/1983 | Clearman et al. | 126/617 | |
| 4,392,531 A * | 7/1983 | Ippolito | 165/45 | |
| 4,399,656 A | 8/1983 | Laing | | |
| 4,402,188 A * | 9/1983 | Skala | 165/10 | |
| 4,412,426 A * | 11/1983 | Yuan | 165/45 | |
| 4,418,549 A | 12/1983 | Courneya | | |
| 4,440,148 A | 4/1984 | Assaf | | |
| 4,445,566 A * | 5/1984 | Laing et al. | 165/10 | |
| 4,448,237 A | 5/1984 | Riley | | |

(56) References Cited

U.S. PATENT DOCUMENTS

| | | | |
|---|---|---|---|
| 4,459,177 A * | 7/1984 | O'Hare | C02F 1/14 |
| | | | 126/620 |
| 4,491,172 A * | 1/1985 | Hitchin | 165/10 |
| 4,498,454 A | 2/1985 | Assaf | |
| 4,510,920 A | 4/1985 | Walmet | |
| 4,516,629 A | 5/1985 | Bingham | |
| 4,520,862 A * | 6/1985 | Helmbold | 165/10 |
| 4,522,254 A | 6/1985 | Koizumi | |
| 4,524,756 A * | 6/1985 | Laverman | 165/10 |
| 4,526,005 A * | 7/1985 | Laing et al. | 165/45 |
| 4,554,797 A | 11/1985 | Goldstein | |
| 4,566,527 A | 1/1986 | Pell | |
| 4,577,679 A | 3/1986 | Hibshman | |
| 4,590,993 A * | 5/1986 | Kurzweg | 165/10 |
| 4,607,488 A | 8/1986 | Karinthi | |
| 4,609,036 A * | 9/1986 | Schrader | 165/10 |
| 4,632,604 A | 12/1986 | McKelvy | |
| 4,642,987 A | 2/1987 | Csorba | |
| 4,671,347 A * | 6/1987 | MacCracken | 165/10 |
| 4,671,351 A * | 6/1987 | Rappe | 165/45 |
| 4,693,301 A | 9/1987 | Baehrle | |
| 4,696,338 A * | 9/1987 | Jensen et al. | 165/10 |
| 4,741,386 A * | 5/1988 | Rappe | 165/45 |
| 4,781,033 A * | 11/1988 | Steyert et al. | 165/10 |
| 4,793,146 A * | 12/1988 | Ryokai | 62/260 |
| 4,850,424 A * | 7/1989 | Mitani et al. | 165/10 |
| 4,878,540 A * | 11/1989 | Raymond | 165/45 |
| 4,881,593 A * | 11/1989 | Okayasu | 165/10 |
| 4,977,953 A * | 12/1990 | Yamagishi et al. | 165/10 |
| 5,184,669 A * | 2/1993 | Tamme et al. | 165/10 |
| 5,224,357 A * | 7/1993 | Galiyano et al. | 165/45 |
| 5,228,504 A * | 7/1993 | Mantegazza et al. | 165/10 |
| 5,246,061 A * | 9/1993 | Zalite | 165/10 |
| 5,272,879 A * | 12/1993 | Wiggs | F01K 25/08 |
| | | | 165/45 |
| RE34,542 E * | 2/1994 | Rockenfeller | 62/106 |
| 5,289,690 A * | 3/1994 | Rockenfeller et al. | 62/475 |
| 5,355,688 A | 10/1994 | Rafalovich | |
| 5,477,703 A * | 12/1995 | Hanchar et al. | 165/45 |
| 5,488,828 A * | 2/1996 | Brossard | F03G 7/04 |
| | | | 60/641.6 |
| 5,507,149 A | 4/1996 | Dash | |
| 5,551,238 A * | 9/1996 | Prueitt | F22B 1/20 |
| | | | 60/643 |
| 5,598,712 A * | 2/1997 | Watanabe et al. | 62/59 |
| 5,598,720 A * | 2/1997 | MacCracken et al. | 165/10 |
| 5,634,339 A * | 6/1997 | Lewis et al. | 60/650 |
| 5,678,626 A * | 10/1997 | Gilles | 62/59 |
| 5,816,314 A * | 10/1998 | Wiggs et al. | 165/45 |
| 5,937,663 A | 8/1999 | Chen | |
| 5,941,238 A * | 8/1999 | Tracy | 62/260 |
| 5,944,089 A * | 8/1999 | Roland | 165/10 |
| 5,946,928 A * | 9/1999 | Wiggs | 165/45 |
| 6,101,821 A * | 8/2000 | Cates | 62/139 |
| 6,105,659 A * | 8/2000 | Pocol et al. | 165/10 |
| 6,129,141 A * | 10/2000 | Yang | A61K 9/0031 |
| | | | 165/45 |
| 6,220,337 B1 * | 4/2001 | Chen et al. | 165/10 |
| 6,220,339 B1 * | 4/2001 | Krecke | 126/585 |
| 6,412,281 B2 * | 7/2002 | Cover | F01K 27/005 |
| | | | 60/670 |
| 6,672,372 B1 * | 1/2004 | Li et al. | 165/10 |
| 6,701,914 B2 * | 3/2004 | Schwarz | 165/10 |
| 6,978,826 B2 * | 12/2005 | Matsubara | F24D 11/007 |
| | | | 165/45 |
| 7,007,501 B2 | 3/2006 | Hu | |
| 7,062,911 B2 * | 6/2006 | Yang | F03G 7/04 |
| | | | 60/641.1 |
| 7,082,779 B2 * | 8/2006 | Xu et al. | 165/45 |
| 7,401,641 B1 * | 7/2008 | Wiggs | 165/45 |
| 7,621,129 B2 * | 11/2009 | DuBois | F03D 9/002 |
| | | | 60/641.1 |
| 7,810,551 B2 * | 10/2010 | Ippoushi et al. | 165/104.28 |
| 7,942,015 B2 * | 5/2011 | Hart | 62/260 |
| 7,984,613 B2 * | 7/2011 | DuBois | F03D 9/002 |
| | | | 290/1 R |
| 8,047,905 B2 * | 11/2011 | Everett | F24F 5/0046 |
| | | | 165/45 |
| 8,307,896 B2 * | 11/2012 | Sarria | 165/45 |
| 8,327,920 B2 * | 12/2012 | Kudo | 165/10 |
| 8,443,868 B2 * | 5/2013 | Barnwell | 165/10 |
| 8,567,482 B2 * | 10/2013 | Yin et al. | 165/10 |
| 8,584,734 B2 * | 11/2013 | Shimozono | 165/10 |
| 8,650,875 B2 * | 2/2014 | Wiggs | F03G 7/04 |
| | | | 60/641.2 |
| 8,662,147 B2 * | 3/2014 | Juris | 165/45 |
| 8,677,752 B2 * | 3/2014 | DuBois | F03D 9/002 |
| | | | 60/641.2 |
| 9,080,789 B2 * | 7/2015 | Hamstra | F24D 12/02 |
| 9,103,603 B2 * | 8/2015 | Yang | F24J 3/082 |
| 2002/0036076 A1 * | 3/2002 | Eastman | F28D 15/0266 |
| | | | 165/45 |
| 2004/0011395 A1 * | 1/2004 | Nicoletti et al. | 136/246 |
| 2006/0196631 A1 * | 9/2006 | Small et al. | 165/10 |
| 2006/0201179 A1 * | 9/2006 | Kidwell et al. | 165/45 |
| 2006/0201180 A1 * | 9/2006 | Kidwell et al. | 165/45 |
| 2007/0017243 A1 * | 1/2007 | Kidwell et al. | 165/45 |
| 2007/0023164 A1 * | 2/2007 | Kidwell et al. | 165/45 |
| 2007/0029065 A1 * | 2/2007 | Takahashi et al. | 165/10 |
| 2007/0029066 A1 * | 2/2007 | Kidwell et al. | 165/45 |
| 2007/0199341 A1 * | 8/2007 | Hart | 62/260 |
| 2008/0016866 A1 * | 1/2008 | Mohr | 60/649 |
| 2008/0148758 A1 * | 6/2008 | Kidwell et al. | 165/45 |
| 2008/0196859 A1 * | 8/2008 | Kidwell et al. | 165/45 |
| 2008/0289793 A1 * | 11/2008 | Geiken et al. | 165/10 |
| 2009/0175603 A1 * | 7/2009 | Gode | 392/346 |
| 2009/0211727 A1 | 8/2009 | Yin | |
| 2009/0277602 A1 * | 11/2009 | Yang | 165/45 |
| 2009/0277603 A1 * | 11/2009 | Yang | 165/10 |
| 2010/0018667 A1 * | 1/2010 | Khelifa et al. | 165/10 |
| 2010/0018679 A1 * | 1/2010 | Yang | 165/104.28 |
| 2010/0025008 A1 * | 2/2010 | Walford | 165/45 |
| 2010/0270003 A1 * | 10/2010 | Sarria | 165/45 |
| 2010/0294456 A1 * | 11/2010 | Taraba | F24D 3/18 |
| | | | 165/45 |
| 2011/0226440 A1 * | 9/2011 | Bissell et al. | 165/10 |
| 2011/0303388 A1 * | 12/2011 | Mittelmark et al. | 165/10 |
| 2012/0180508 A1 | 7/2012 | Endoh | |
| 2012/0227926 A1 * | 9/2012 | Field et al. | 165/10 |
| 2015/0253084 A1 * | 9/2015 | Beck | F28D 20/0056 |
| | | | 165/10 |
| 2015/0276234 A1 * | 10/2015 | Muro | F28D 20/0056 |
| | | | 62/187 |
| 2015/0276325 A1 * | 10/2015 | Pilebro | F28D 20/0034 |
| | | | 165/10 |
| 2015/0299641 A1 * | 10/2015 | Galliher | C12M 41/24 |
| | | | 435/298.1 |
| 2015/0316296 A1 * | 11/2015 | Yang | F24J 3/082 |
| | | | 165/45 |

FOREIGN PATENT DOCUMENTS

| | | | | |
|---|---|---|---|---|
| CN | 102607208 | | 7/2012 | |
| CN | 102762948 A | | 10/2012 | |
| DE | 130466 | | 4/1978 | |
| DE | 2801791 | | 7/1979 | |
| DE | 2811439 | | 9/1979 | |
| DE | 10039581 | | 6/2002 | |
| DE | 102007033301 A1 * | | 1/2009 | F24J 3/08 |
| DE | 102008001308 | | 7/2009 | |
| EP | 0198808 | | 10/1986 | |
| EP | 0819893 | | 7/1997 | |
| EP | 2141433 | | 6/2009 | |
| FR | 2372751 A1 | | 6/1978 | |
| GB | 1247965 A | | 9/1971 | |
| GB | 1503643 A * | | 3/1978 | |
| GB | 1526024 A * | | 9/1978 | |
| GB | 1593406 A * | | 7/1981 | |
| JP | H11158899 A | | 6/1999 | |
| JP | 2002173946 A | | 6/2002 | |
| JP | 2003262483 | | 9/2003 | |
| JP | 3648669 | | 5/2005 | |

(56) References Cited

FOREIGN PATENT DOCUMENTS

| KR | 101170274 | | 7/2012 |
|---|---|---|---|
| WO | 8300526 | | 2/1983 |
| WO | 9614544 | | 5/1996 |
| WO | WO 0161261 A1 | * | 8/2001 |
| WO | 2011016768 | | 2/2011 |
| WO | 2011016768 | | 4/2011 |
| WO | 2013173709 | | 11/2013 |

OTHER PUBLICATIONS

Turner, J.S.,"Ventilation and thermal constancy of a colony of a southern African Termite (*Odontotermes transvaalensis:Macrotermitinae*)". Journal of Arid Environments (1994) vol. 28, pp. 231-248. [online] [retrieved Apr. 5, 2015] Retrieved from internet: <URL: http://biomimetic.pbworks.com/f/Ventilation+and+thermal+constancy+ofTurner.pdf>.*

Turner, J.S., "On the Mound of Macrotermes michaelseni as an Organ of Respiratory Gas Exchange". Physiological and Biochemical Zoology, 2001.vol. 74, No. 6, pp. 798-822.[online] [retrieved Apr. 5, 2015]. Retrieved: <URL: http://documents.epfl.ch/users/m/mp/mpottera/public/SuperS09/CS5_Termites_Mounds/Physiological%20and%20Biochemical%20Zoology.pdf>.*

Bonabeau, E. et al., "A model for the emergence of pillars, walls and royal chambers in termite nests." The Royal Society of London, vol. 353, pp. 1561-1576. 1998. [online] [retrieved on Apr. 5, 2015] Retrieved from internet:<URL:http://cognition.ups-tlse.fr/_guyt/documents/articles/26.pdf>.*

Kleineidam, C. et al., Wind-induced ventilation of the giant nests of the leaf-cutting ant Atta Vollenweideri . . . Jul. 2001. Konstanzer Online-Publikations-System (KOPS). [online] [retrieved on Apr. 5, 2015]. Retrieved from internet: <URL: http://kops.uni-konstanz.de/bitstream/handle/123456789/15833/kleineidamwindinduced.pdf?sequence=1>.*

Curl, Rane L., "Cave Conduit Enlargement by Natural Convection". Cave Notes, vol. 8, No. 1, Jan./Feb. 1966, pp. 1-6. [online] [retrieved on Apr. 5, 2015] Retrieved from the internet: <URL: http://www.karstportal.org/FileStorage/Caves_and_Karst/1966-v008-n001.pdf>.*

"Mersey Railway Tunnel/The Mersey Tunnel", from Scientific American—Saturday, Mar. 13, 1886. [online], [retrieved on Jul. 10, 2015]. Retrieved from the Internet <URL: https://web.archive.org/web/20110813182307/http://upton.cx/newwebsite/wir2.php>.*

"Mercy Railway Tunnel", Scientific American, Mar. 13, 1886 [online], [retrieved on Aug. 13, 2011]. Retrieved from the internet <URL: https://web.archive.org/web/20110813182307/http://www.upton.cx/newwebsite/wir2.php>.*

International Search Report for PCT/SE2010/050808, Completed by the European Patent Office on Jan. 28, 2011, 2 Pages.

Nordell et al. "The Combi Heat Store—a Combined Rock Cavern/Borehole Heat Store", Tunnelling and Underground Space Technology 1994, vol. 9, No. 2, p. 243-249.

Finnish Office Action for Application No. FI 20106047, English translation attached to original, Dated May 13, 2014, All together 8 Pages.

Kai Nielsen, professor, dr.ing. Dept. of Geology and Mineral Resources Engineering NTNU; Trondheim, Jan. 2003 Revised version after Brekstad seminar on Jan. 22-23, 2003. Thermal Energy Storage a State-of-the-Art; A report within the search program Smart Energy-Efficient Buildings at NTNE and SINTEF 2002-2006; 25 pgs.

* cited by examiner

ARRANGEMENT FOR STORING THERMAL ENERGY

CROSS-REFERENCE TO RELATED APPLICATION

This application is the U.S. national phase of PCT Appln. No. PCT/SE2010/050808 filed Jul. 12, 2010 which claims priority to Swedish application 0950576-9 filed Aug. 3, 2009, the disclosures of which are incorporated in their entirety by reference herein.

TECHNICAL FIELD

The invention relates in general to an arrangement for storing thermal energy. In particular the invention relates to an arrangement for storing thermal energy of a fluid provided in a container, such as an underground rock cavity.

The invention also relates to a method for improving an arrangement for storing thermal energy.

BACKGROUND OF THE INVENTION

Within various fields of application regarding modern energy technologies efficient possibilities for storage of thermal energy is required.

One technique of storing thermal energy is achieved by providing a fluid, such as e.g. water, in a subterranean chamber. The thermal energy of the fluid is to a great extent conserved within the chamber during an extended period of time. Today this technique is used in different parts of the world so as to satisfy needs of storing thermal energy between different seasons.

Storage of thermal energy in caverns is mainly achieved by a temperature difference within water filled in an excavated cavern. As water has approximately double heat capacity compared to a corresponding volume of rock, efficient heat storage is achieved according to this method. The rock surrounding the cavern is used as insulation. Due to large scale effects a relatively good insulation is achieved. The surrounding rock also to some extent contributes to the storage function.

Due to high initial costs relating to preparation of caverns for storing thermal energy, few projects have been realized so far. One thermal energy storing plant is located in Lyckebo, Sweden. The plant for thermal energy storage in Lyckebo basically comprises a tunnel surrounding and an excavated cavern having storage volume of about 100.000 m3. Both the tunnel and the chamber are filled with water. The tunnel and the chamber define separated volumes for holding water for storage of thermal energy. The water contained in the tunnel and the chamber, respectively, are substantially in fluid communication with each other. However, as depicted below, the plant suffers from some drawbacks.

This particular plant has been in use since 1984 and is today still in operation. In the Lyckebo plant telescopic extraction pipes have been used. The telescopic extraction pipes are arranged to extract water at level in the cavern having a desired temperature and to return used water having another temperature at an appropriate level in the cavern. The warmest water in the storage may be spared until required. Use of the telescopic extraction and return pipes allows a distinct separation layer between warmer and colder water within the cavern to during use continuously be reduced to a minimum.

In the Lyckebo plant some unexpected leakage of water from the storage cavern to the surrounding access tunnel has been detected. Said leakage has resulted in an increased heat loss from the stored water by approximately 30%. The surrounding tunnel achieved a higher temperature than expected. Thermal energy stored in the tunnel has not been efficiently utilized in the plant.

The "surrounding access tunnel" in Lyckebo was initially designed to minimize required area for the storage. Another purpose was to equalize the ground water pressure around the cavern. A ground water flow would then enter into the tunnel "upstream" and leak out "downstream" from the tunnel. No further attempts were performed to minimize heat leakage due to ground water flow, if any.

It therefore exist a need to provide an improved arrangement for storing thermal energy under ground.

SUMMARY OF THE INVENTION

An object according to an aspect of present invention is to provide an environment friendly arrangement for storing thermal energy under ground.

An object according to an aspect of present invention is to provide an arrangement for storing thermal energy, in which arrangement overall thermal energy losses can be reduced.

Another object according to an aspect of the present invention is to provide an improved arrangement for storing thermal energy.

Yet another object of the invention is to provide a more cost effective arrangement for storing thermal energy requiring no or minimized maintenance.

These and other objects are achieved by an arrangement for storing internal energy according to claim 1.

According to an aspect of the invention there is provided an arrangement for storing thermal energy. The arrangement comprises at least one subterranean chamber for holding a first fluid, wherein a passage holding a second fluid is extended outside at least a part of said at last one chamber, wherein the at least one channel is arranged to allow fluid communication of said first fluid between different sections of said chamber, and/or the at least one channel is arranged to allow fluid communication of said second fluid between different sections of said passage.

By providing at least one channel allowing fluid communication of said first fluid between separated sections of the chamber an improved thermal storage capacity is achieved.

By providing at least one channel allowing fluid communication of said second fluid between separated sections of the passage an improved thermal storage capacity is achieved.

The media, such as e.g. rock or soil, surrounding the chamber and the at least one channel associated thereto holding the first fluid is advantageously providing a first energy storage.

The media, such as e.g. rock or soil, surrounding the passage and the at least one channel associated thereto holding the first fluid is advantageously providing a second energy storage. The second energy storage is advantageously provided outside the first energy storage.

The first and second energy storage advantageously provides an increased thermal storage capacity of the inventive arrangement.

By providing the at least one channel allowing fluid communication of said first fluid and at least one channel allowing fluid communication of said second fluid a further improved arrangement for storing thermal energy is achieved according to the invention.

The first fluid is containing a certain thermal energy. The thermal energy of the first fluid may be substantially conserved within the chamber during an extended period of time. The thermal energy of the first fluid may be increased during a summer period by means of e.g. solar panels and stored in the chamber for later use. The thermal energy of the first fluid may be used during a winter period.

Alternatively, the thermal energy of the first fluid may be reduced during a winter period and stored in the chamber for later use. The thermal energy of the first fluid may be used during a summer period.

In a similar way, the second fluid is containing a certain thermal energy. The thermal energy of the second fluid may be substantially conserved within the passage during an extended period of time. The thermal energy of the second fluid may be increased during a summer period by means of e.g. solar panels and stored in the passage for later use. The thermal energy of the second fluid may be used during a winter period.

Alternatively, the thermal energy of the second fluid may be reduced during a winter period and stored in the passage for later use. The thermal energy of the second fluid may be used during a summer period.

The sections of the passage may be separated in height. In a case where the sections of the passage are separated in height a more efficient gradient thermal flow of the second fluid within the arrangement is achieved.

The sections of the chamber may be separated in height. In a case where the sections of the chamber are separated in height a more efficient gradient thermal flow of the first fluid within the arrangement is achieved.

The sections of the passage interconnecting the at least one channel may be separated in height. The sections of the chamber interconnecting the at least one channel may be separated in height.

The passage may be surrounding said at last one chamber. The passage may be a tunnel used when forming the subterranean chamber. In case the passage is surrounding the at least one chamber an increased thermal storage capacity is achieved. Thermal interaction between the material surrounding the chamber and the passage is providing an overall improved arrangement for storing thermal energy, according to an aspect of the invention.

By using the passage, required for forming the at least one chamber for storing said second fluid, an improved arrangement for storing thermal energy is achieved. The passage is arranged to hold the second fluid. The chamber holding the first fluid and the passage holding the second fluid is substantially not in fluid communication with each other. However, a small extent of the first fluid may escape from the chamber due to e.g. inherent characteristics of a surrounding medium, such as e.g. a rock. The passage is arranged to receive some of the escaped first fluid and is thereby providing a larger energy storage capacity, as escaping energy can be used in the second fluid.

The chamber holding the first fluid and the at least one channel holding the second fluid is substantially not in fluid communication with each other. However, a small extent of the first fluid may escape from the chamber due to e.g. inherent characteristics of the surrounding medium. The at least one channel is arranged to receive some of the escaped first fluid and is thereby providing a larger energy storage capacity.

The at least one channel may be a plurality of channels forming a fluid curtain outside said at least one chamber. The fluid curtain may comprise an arbitrary number of channels. The fluid curtain may comprise a suitable number of channels. According to one example the fluid curtain comprises 10-100 channels.

According to one example the at least one channel is a drilled hole formed by means of a drilling machine. According one example the channel is formed by jacking.

The dimension of the at least one channel may be suitable chosen. According to one example the channel is a drilled hole having a diameter of 1 decimeter. According to a second example the channel is a drilled hole having a diameter of 2 decimeters. According to a second example the channel is a drilled hole having a diameter of 3 decimeters. According to an embodiment of the invention the at least one channel has an arbitrary dimension.

By providing a plurality of channels between different sections of the passage an effective fluid curtain is achieved. According to one example 10-100 channels arranged to hold the second fluid are provided. According to one example 10-100 channels arranged to hold the first fluid are provided. According to one example more than 100 channels arranged to hold the first fluid are provided. According to one example more than 100 channels arranged to hold the second fluid are provided.

The channels are arranged to hold a part of the second fluid. The at least one chamber holding the first fluid and the at least one channel holding the second fluid is substantially not in fluid communication with each other. However, a small extent of the first fluid may escape from the chamber due to e.g. inherent characteristics of a surrounding medium, such as e.g. rock. The passage and the thereto connecting channels are arranged to receive some of the escaped first fluid and is thereby providing a more environmental friendly arrangement for storing thermal energy.

In a case where the first fluid is oil, salt water, ammonia or other fluid other than substantially pure water, the second fluid has to be of higher pressure than the first fluid resulting in leakage into the chamber.

The at least one channel may be vertically arranged between said separated sections of the passage. By providing the at least one channel vertically, a maximum thermal gradient flow is achieved.

The at least one channel may be vertically arranged between said separated sections of the chamber. By providing the at least one channel vertically, a maximum thermal gradient flow is achieved.

The at least one channel may be arranged between said separated sections of said passage at an arbitrary inclination relative a horizontal plane allowing thermal natural convection, such as an inclination between 1:10 and vertical relative the horizontal plane. By providing the at least one channel at an inclination between 1:10 and vertical relative the horizontal plane, an increased energy storage capacity is achieved.

According to one embodiment the at least one channel may be arranged between said separated sections of said passage at an inclination between horizontal and 1:10 relative a horizontal plane. According to this embodiment thermal natural convection of the second fluid is limited and a fluid pump and separation arrangements of the passage may be suitable arranged within the inventive arrangement so as to provide a desired flow of the second fluid within the arrangement.

The passage 110 may comprise at least two separated parts divided by a sealing element. The passage 110 having at least two separated parts is herein referred to as a (one) passage 110.

The passage 110 may comprise two or more separated tunnels (passage 110). According to an aspect of the invention the at least one channel is provided between different sections of the separated tunnels. According to one example a chamber for storing the first fluid is at least partly surrounded by two separated tunnels having at least one channel allowing fluid communication of the second fluid between the two tunnels.

The first and/or second fluid may be chosen from a group comprising: water, a mixture of water and a coolant, any liquid fuels, such as hydro carbons of fossil origin or biological origin (biofuel), salt solution, ammonia or other refrigerants.

According to a preferred application the first fluid is water substantially free from contamination. According to a preferred application the second fluid is water substantially free from contamination. Water is a many different geographic areas a cheap and environmental friendly fluid.

The chamber may be a cavern made in a rock. In a case where the chamber is a cavern in bedrock there is provided a robust insulation for conserving thermal energy of the first fluid. This also holds true in a case where the passage is formed in bedrock.

The passage may be configured as a helix. The passage may be configured in a spiral form. The passage may have any shape so that it is at least partly surrounding the chamber. The passage may be configured in a substantially helix formed shape. The helix shape is a desired shape in various applications because it provides an easy manufacturing process involving great access of heavy vehicles for removing material from both the passage itself and the chamber. According to one example the passage has a maximum inclination of dimensions 1:7.

The arrangement may further comprise a first fluid communication means arranged to extract an arbitrarily portion of said first fluid from the chamber at a suitable vertical level so as to allow processing of said first fluid by means of a first heat exchanger, wherein said first fluid communication means further is arranged to return the processed first fluid to the chamber at a suitable vertical level.

A suitable level for extracting the arbitrary portion of said first fluid may be an arbitrary vertical level of the passage. In practice it is desired to provide the first heat exchanger with a fluid having a predetermined temperature. It may in different ways be possible to determine a temperature distribution within the first fluid and determine a suitable vertical level of extraction accordingly.

A suitable level for returning the processed first fluid may be at a vertical level of the chamber holding the first fluid of about the same temperature as the processed first fluid.

The arrangement may further comprise an energy source coupled to said first heat exchanger and/or a second heat exchanger, which second heat exchanger is arranged to increase and/or reduce thermal energy of the first fluid and/or the second fluid.

According to what is depicted above the first fluid may be used for heating purposes. The first fluid may alternatively be used for cooling purposes.

The energy source may be any of a group of energy sources comprising: a thermal electrical power arrangement for heating and/or cogeneration of electricity and heat, a spare unit, such as e.g. an emergency electricity generator, solar panels for heating or solar panels for combined electrical generation and heating, bio fuel heater, oilfired boiler, or a boiler powered by fossil fuel or bio fuel, such as pellet.

Alternatively a lake can be used as an energy source, allowing reducing thermal energy of the first and/or second fluid. Alternatively ambient air can be used as an energy source, allowing reducing thermal energy of the first and/or second fluid. Alternatively roads or streets can be used as an energy source, allowing reducing thermal energy of the first and/or second fluid. Alternatively airport runways can be used as an energy source, allowing reducing thermal energy of the first and/or second fluid. Alternatively roofs and outer or inner walls of buildings can be used as an energy source, allowing reducing thermal energy of the first and/or second fluid. Alternatively parking lots can be used as an energy source, allowing reducing thermal energy of the first and/or second fluid.

According to one example lake can be used as an energy source, allowing increasing thermal energy of the first and/or second fluid. Alternatively ambient air can be used as an energy source, allowing increasing thermal energy of the first and/or second fluid. Alternatively roads or streets can be used as an energy source, allowing increasing thermal energy of the first and/or second fluid. Alternatively airport runways can be used as an energy source, allowing increasing thermal energy of the first and/or second fluid. Alternatively roofs and outer or inner walls of buildings can be used as an energy source, allowing increasing thermal energy of the first and/or second fluid. Alternatively parking lots can be used as an energy source, allowing increasing thermal energy of the first and/or second fluid.

According to an aspect of the invention a temperature of said first fluid is within a temperature interval of 4-100 degrees Celsius. According to an aspect of the invention a temperature of said first fluid is within an interval of 4-100 degrees Celsius.

In a case where the first fluid is water a suitable temperature interval may be −5-20 degrees Celsius. According to yet an example a suitable temperature interval may be 0-4 degrees Celsius. According to yet an example a suitable temperature interval may be 4-15 degrees Celsius.

According to an aspect of the invention a temperature of said first fluid, being a refrigerant or other coolants, or propane, is within a temperature interval of −50 to 20 degrees Celsius.

According to an aspect of the invention a temperature of said first fluid is within a temperature interval of 90-200 degrees Celsius.

According to an aspect of the invention the arrangement may comprise two or three chambers, wherein the passage holding the second fluid is extended outside at least a part of at last one chamber. The chambers may be arranged beside each other at a suitable distance from each other. According to one example two chambers are arranged beside each other and a third chamber is arranged beneath said two chambers.

An arbitrary number of chambers may be provided for storing thermal energy according to the invention. The two or more chambers may contain mutually different kind of fluids. For example, a first chamber may contain and store water and a second chamber may contain a salt solution or combustible oil.

In certain configurations of the arrangement having two or more chambers containing different kind of first fluids, a separation member may be provided so as to separate each chamber from each other.

According to an aspect of the invention there is provided an arrangement wherein said at least one chamber may be a first chamber and a second chamber separated from each other and vertically arranged relative each other, and wherein at least one of said first and second chamber is surrounded by the passage holding the second fluid.

According to an aspect of the invention there is provided an arrangement wherein said at least one chamber may be a first chamber, a second chamber and a third chamber separated from each other and vertically arranged relative each other, and wherein at least one of said first, second and third chamber is surrounded by the passage holding the second fluid.

The arrangement may further comprise a second fluid communication means arranged to extract an arbitrarily portion of said second fluid from the passage at a suitable level so as to allow processing of said second fluid by means of a second heat exchanger, wherein said second fluid communication means further is arranged to return the processed second fluid to the passage at a suitable vertical level.

A suitable level for extracting the arbitrary portion of said second fluid may be an arbitrary vertical level of the passage. In practice it is desired to provide the second heat exchanger with a fluid having a predetermined temperature. It may in different ways be possible to determine a temperature distribution within the second fluid and determine a suitable vertical level of extraction accordingly.

A suitable level for returning the processed second fluid may be at a vertical level of the passage holding the second fluid of about the same temperature as the processed second fluid.

According to an aspect of the invention there is provided a method for improving an arrangement for storing thermal energy, wherein said arrangement comprises at least one subterranean chamber for holding a first fluid, wherein a passage holding a second fluid is extended outside at least a part of said at least one chamber. The method may comprise the step of providing at least one channel to allow fluid communication of said first fluid between different sections of said chamber. The method may additionally, or alternatively, comprise the step of providing at least one channel to allow fluid communication of said second fluid between different sections of the passage.

The step of providing at least one channel may comprise the step of drilling said channel by means of a drilling unit such as e.g. a rock drilling machine.

The step of providing at least one channel may comprise the step of applying a pipe constituting said channel by means of pipe jacking.

One positive outcome of the arrangement according to an aspect of the invention is that a more reliable arrangement for storing thermal energy is achieved. In case the chamber is a cavern within a bed rock the arrangement is providing a relative disruption free environment. Rock or bed rock is considered to be a stable environment for storing thermal energy contained in a fluid such as water.

Another positive outcome of the arrangement is that chambers may be manufactured by TBM's. Further the passage and channels may be formed by pipe jacking.

The arrangement as such is environmental friendly due to fact that waste heat from in theory any energy source may made use of. Therefore an overall waste energy is reduced.

The arrangement requires low maintenance in the long run due to that mechanical or electrical support means may be kept up from the surface of the ground. The mechanical and electrical support means may for example be the first and second heat exchanger. The mechanical and electrical support means may for example be the first and second fluid communication means. A low maintenance arrangement for storing thermal energy is relatively cheap to operate. The arrangement according to the invention is thus providing a cost effective solution to the problems stated above.

Alternatively machine rooms comprising one or more pumps for extracting and returning the first and/or the second fluid to the chamber and passage, respectively, may be provided in machine rooms under ground. One or more heat exchanger for operation according to an aspect of the invention may also be provided in the machine rooms under ground.

By providing second fluid communication means working in parallel with the first communication means allowing to reduce or increase the thermal energy of the second and first fluid, respectively, provides an arrangement for storing thermal energy having improved capacity relative prior art arrangements.

A beneficial contribution of the invention is that vertical arrangement of two or more chambers having a single passage allows use of a building site of minimized proportions. Since land may be quite costly a minimal area on ground needs to be purchased before commencing constructional work of the arrangement, such as blasting the passage and the chambers.

Additional objects, advantages and novel features of the present invention will become apparent to those skilled in the art from the following details, as well as by practice of the invention. While the invention is described below, it should be understood that the invention is not limited to the specific details disclosed. A person skilled in the art having access to the teachings herein will recognise additional applications, modifications and embodiments in other fields, which are within the scope of the invention.

BRIEF DESCRIPTION OF THE DRAWINGS

For a more complete understanding of the present invention and further objects and advantages thereof, reference is now made to the examples shown in the accompanying drawings, wherein same reference numerals relate to substantially the same features throughout the different drawings, in which drawings.

DETAILED DESCRIPTION OF THE DRAWINGS

Figure 1:
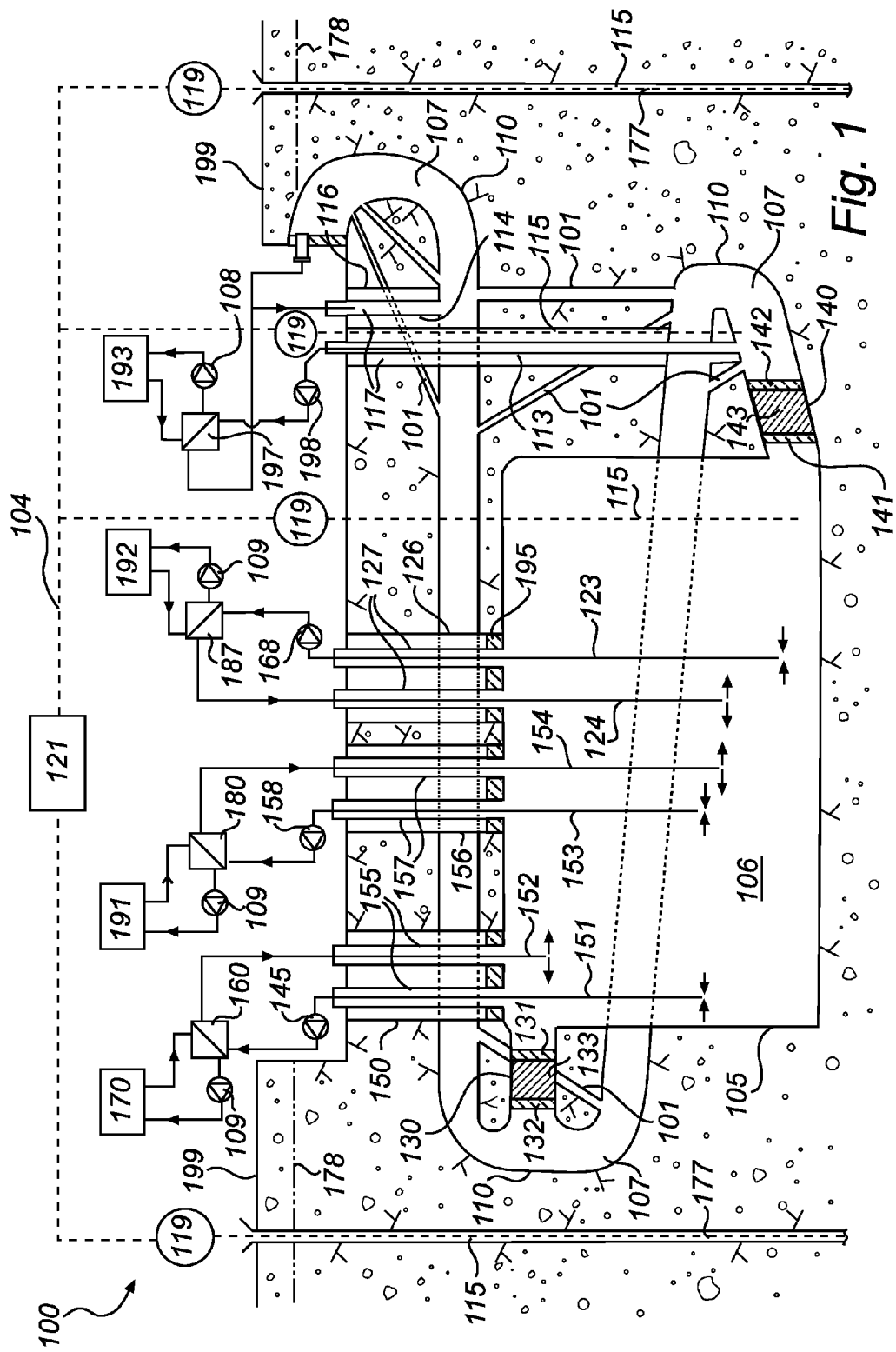
FIG. 1 schematically illustrates an arrangement for storing thermal energy, according to an aspect of the invention.

With reference to FIG. 1 there is schematically illustrated an arrangement 100 for storing thermal energy, according to an aspect of the invention.

According to this example a passage 110 is provided underground. A ground surface is generally indicated by a reference numeral 199. The passage 110 has been formed by any suitable means, such as drilling machines and/or explosives. Typically the passage 110 has a cross sectional area of about 30-40 m2. According to this example the dimensions of the passage 110 are about 6×6 meters. The passage 110 may also be referred to as a tunnel. Initially the purpose of forming the passage 110 is to allow working crew to form a chamber 105. The chamber 105 is also referred to as a container or fluid storing means. The chamber 105 may have one or more initial inlets. The chamber 105 illustrated with reference to FIG. 1 has a first initial inlet 130 and a second initial inlet 140.

The first initial inlet 130 is used when forming a roof of the chamber 105. The roof and the walls of the chamber 105 may be suitably enforced and/or sealed so as to improve robustness of the chamber 105 and to minimize leakage of e.g. ground water into the chamber 105. The second initial inlet 140 is used when forming a bottom part of the chamber 105. The surrounding medium can be sealed by grouting so as to avoid undesired leakage caused by inherent characteristics, such as cracks, of the surrounding medium.

After the chamber 105 has been prepared the first initial inlet 130 is sealed by at least one first concrete block 131 and preferably a thereto spaced second concrete block 132. The chamber 105 and the passage 110 are thermally sealed by means of a separation member. The chamber 105 and the passage 110 are fluidly sealed by means of a separation member. Between the first concrete block 131 and the second concrete block 132 there is provided an insulation unit 133 made of any suitable material, such as gravel, soil or a mixture of insulation and concrete or granulate concrete. Thereby there is provided a first open space within the chamber 105 and a second open space within the passage 110.

After the chamber 105 has been prepared the second initial inlet 140 is sealed by a first concrete block 141 and preferably a thereto spaced second concrete block 142. The chamber 105 and the passage 110 are also here thermally sealed by means of a separation member. The chamber 105 and the passage 110 are also here fluidly sealed by means of a separation member. Between the first concrete block 141 and the second concrete block 142 there is provided a suitable material 143, such as gravel or soil, or a mixture of insulation and concrete or granulate concrete.

Before commencing operation of the arrangement 100, a desired amount of the first fluid 106 is provided to the chamber 105. According to a preferred embodiment the first fluid 106 contains water. According to this example the first fluid 106 is substantially filling up the chamber 105 during operation of the arrangement 100.

The pressure of the first fluid 106 in the chamber 105 is substantially in balance with the pressure of the surrounding ground water. The pressure of the second fluid 107 in the passage 110 is substantially in balance with the pressure of the surrounding ground water.

A first shaft 150 is arranged from the surface 199 of the ground to the chamber 105. The first shaft 150 may have any suitable dimensions. There is provided a first fluid communication device 155 arranged to extract a portion of a first fluid 106 from the chamber 105 at a suitable vertical level and to provide the extracted portion of the first fluid 106 to a first heat exchanger 160. The first fluid communication device 155 is also arranged to return the first fluid 106 back to the chamber 105. The first fluid communication device 155 may comprise a pump 145 being arranged to pump the first fluid 106 from the chamber 105 to the first heat exchanger 160. The first heat exchanger 160 is arranged to perform a heat transfer process. The first fluid communication device 155 is arranged to return the processed first fluid 106 back to the chamber 105 at a suitable vertical level. The first communication means 155 is generally designed to increase the thermal energy of the first fluid 106 by means of said heat transfer process.

According to one example the first fluid communication device 155 comprises a pair of telescopic pipes, which may be controlled mutually independent. A first pipe 151 of the first fluid communication device 155 is arranged to extract the first fluid 106 from the chamber 105 at an arbitrary vertical level in the chamber 105. A second pipe 152 of the first fluid communication device 155 is arranged to return the first fluid 106 at an arbitrary vertical level in the chamber 105.

A temperature distribution of the first fluid 106, seen in a vertical perspective, is uneven. According to this example the first fluid 106 has a temperature within a temperature range TA. The temperature range TA is ranging between 4 degrees Celsius and 90 degrees Celsius. Due to inherent characteristics of water, colder water is located in a lower section of the chamber 105, and the warmest water is located in an uppermost section of the chamber 105.

A plurality of channels 101 are provided in the arrangement 100 according to the invention. The channels 101 may be drilled by means of a drilling machine. A second fluid 107 is stored in the passage 110.

An energy source 170 is connected to the first heat exchanger 160. The energy source 170 may be an arbitrary suitable energy source. According to a preferred embodiment waste heat of any existing energy source is used for increasing thermal energy of the first fluid 106 within the arrangement 100 for storing thermal energy. Waste heat of the energy source 170 may be collected and transferred to the heat exchanger 160 for heating the first fluid 106 being provided from the chamber 105 by means of the first fluid communication device 155. The first heat exchanger 160 is in any suitable manner connected to the energy source 170. The first heat exchanger 160 is in any suitable manner connected to the first fluid communication means 155.

According to a first example the energy source 170 is an electricity generator powered by fossil fuel, such as combustible oil or gas, or bio fuel or bio gas.

According a second example the energy source 170 comprises solar panels. Waste heat of the solar panels may thereby be transferred to the first heat exchanger 160.

According a third example the energy source 170 may be a condensing side of a heat pump. Whereas the cold evaporator side of the heat pump could have an external heat source, such as air, sea water or an internal heat source from the storage.

According a fourth example the energy source 170 comprises an internal heat source, which means that first fluid 106 can be extracted from the chamber 105 at a vertical level where the temperature is about 15-25 degrees Celsius and a first portion is brought to the condensing side to be heated to a temperature of about 60 degrees Celsius and back to the chamber 105 at an appropriate level. A second portion of the extracted first fluid 106 is brought to an evaporator side to be cooled to a temperature of about 10 degrees Celsius and back to the chamber 105 at an appropriate level.

According to an aspect of the invention there is provided a second fluid communication device 157. The second fluid communication device 157 may be substantially identical with the first fluid communication device 155. The second fluid communication device 157 is arranged to, via a second shaft 156, extract a portion of the first fluid 106 from the chamber 105 and to provide the extracted portion of the first fluid 106 to a second heat exchanger 180. The second heat exchanger 180 may be substantially identical with the first heat exchanger 160. The second shaft 156 may have any suitable dimensions. The second fluid communication device 157 is also arranged to return the extracted first fluid 106 back to the chamber 105 at a suitable level. The second fluid communication device 157 may comprise a pump 158 being arranged to pump the first fluid 106 from the chamber 105 to said second heat exchanger 180. The second heat exchanger 180 is arranged to perform a heat transfer process for heating purposes. The second fluid communication device 157 is arranged to return the processed first fluid 106 back to the chamber 105 at a suitable vertical level.

The second heat exchanger 180 is in any suitable manner connected to a first consumer unit 191. The consumer unit 191 may be any arbitrary consumer unit, such as a house, apartment, industry, real estate, manufacture facility, hospital, etc. The consumer unit 191 is arranged to use the arrangement 100 for heating purposes. For example thermal energy of the arrangement 100 may be used during a cold winter period to heat a building or factory (consumer unit 191). For example the arrangement is arranged to heat various kinds of buildings.

According to one example the second fluid communication device 157 comprises a pair of telescopic pipes, which may be controlled mutually independent. A first pipe 153 of the second fluid communication device 157 is arranged to extract the first fluid 106 from the chamber 105 at an arbitrary vertical level. A second pipe 154 of the second fluid communication device 157 is arranged to return the first fluid 106 at an arbitrary vertical level in the chamber 105.

According to an aspect of the invention there is provided a third fluid communication device 127. The third fluid communication device 127 may be substantially identical with the first fluid communication device 155. The third fluid communication device 127 is arranged to, via a third shaft 126, extract a portion of the first fluid 106 from the chamber 105 and to provide the extracted portion of the first fluid 106 to a third heat exchanger 187. The third heat exchanger 187 may be substantially identical with the first heat exchanger 160. The shaft 126 may have any suitable dimensions. The third fluid communication device 127 is also arranged to return the extracted first fluid 106 back to the chamber 105 at a suitable level. The third fluid communication device 127 may comprise a pump 168 being arranged to pump the first fluid 106 from the chamber 105 to said third heat exchanger 187. The third heat exchanger 187 is arranged to perform a heat transfer process for cooling purposes. The third fluid communication device 127 is arranged to return the processed first fluid 106 back to the chamber 105 at a suitable vertical level.

The third heat exchanger 187 is in any suitable manner connected to a second consumer unit 192. The second consumer unit 192 may be any arbitrary consumer unit, such as a real estate, manufacture facility, hospital, etc. The second consumer unit 192 is arranged to use the arrangement 100 for cooling purposes. For example thermal energy of the arrangement 100 may be used during a warm summer period to cool a building or factory (consumer unit 192).

According to one example the third fluid communication device 127 comprises a pair of telescopic pipes, which may be controlled mutually independent. A first pipe 123 of the third fluid communication device 127 is arranged to extract the first fluid 106 from the chamber 105 at an arbitrary vertical level. A second pipe 124 of the third fluid communication device 127 is arranged to return the first fluid 106 at an arbitrary vertical level in the chamber 105.

According to an aspect of the invention there is provided a fourth fluid communication device 117. The fourth fluid communication device 117 may be substantially identical with the first fluid communication device 155. The fourth fluid communication device 117 is arranged to, via a fourth shaft 116, extract a portion of the second fluid 107 from the passage 110 and to provide the extracted portion of the second fluid 107 to a fourth heat exchanger 197. The fourth heat exchanger 197 may be substantially identical with the first heat exchanger 160. The shaft 116 may have any suitable dimensions. The fourth fluid communication device 117 is also arranged to return the extracted second fluid 107 back to the passage 110 at a suitable level. The fourth fluid communication device 117 may comprise a pump 198 being arranged to pump the second fluid 107 from the passage 110 to said fourth heat exchanger 197. The fourth heat exchanger 197 is arranged to perform a heat transfer process for heating and/or cooling purposes. The fourth fluid communication device 117 is arranged to return the processed second fluid 107 back to the passage 110 at a suitable vertical level.

The fourth heat exchanger 197 is in any suitable manner connected to a third consumer unit 193. The third consumer unit 193 may be any arbitrary consumer unit, such as a real estate, manufacture facility, hospital, etc. The third consumer unit 193 is arranged to use the arrangement 100 for cooling and/or heating purposes. For example thermal energy of the arrangement 100 may be used during a warm summer period to cool a building or factory (consumer unit 193). For example thermal energy of the arrangement 100 may be used during a cold winter period to heat a building or factory (consumer unit 193).

According to one example the fourth fluid communication device 117 comprises a pair of telescopic pipes, which may be controlled mutually independent. A first pipe 113 of the fourth fluid communication device 117 is arranged to extract the second fluid 107 from the passage 110 at an arbitrary vertical level. A second pipe 114 of the fourth fluid communication device 117 is arranged to return the second fluid 107 at an arbitrary vertical level in the passage 110.

Alternatively the fourth fluid communication device 117 is arranged to extract a portion of the second fluid 107 at one or more fix vertical levels of the passage 110. Similarly the second fluid communication device 157 is arranged to return the second fluid 107 at one or more fix vertical levels of the passage 110.

It should be noted that different alternative configurations of the inventive arrangement for storing thermal energy is depicted herein. The different configurations comprising one or more of the depicted arrangements may be provided with an arbitrarily number of fluid communication means, shafts for the at least one chamber of the arrangements, shafts for the passage of the arrangements, heat exchangers, energy sources, and consumer units.

The different configurations comprising one or more of the depicted arrangements may be provided with an arbitrarily number of channels being suitable arranged to allow fluid communication of said first fluid between different sections of said chamber. The different configurations comprising one or more of the depicted arrangements may be provided with an arbitrarily number of channels being suitable arranged to allow fluid communication of said second fluid between different sections of said passage.

According to an embodiment of the invention there is provided pumping means 109, such as a dry installed pump, each being arranged to pump the first or second fluid from a heat exchanger 160, 180, 187, 197 to the energy source 170, or respective consumer unit 191, 192, 193.

It should also be noted that the one or more chambers for storing the first fluid may be associated with one or more passages holding a second fluid. For example, in case two chambers are arranged vertically relative each other, each chamber may be associated with a separate passage.

A ground water level 178 is indicated in FIG. 1.

To minimize for inflow and outflow of ground water from/to the ground water basin, a number of observation holes 177 is arranged to around the chamber 105. By registration of temperatures along the holes in vertical direction, unexpected thermal leakage due to outflow of warm water from the chamber can be observed. By controlling the ground water level/pressure in the chamber 105 and the passage 110, this outflow may be reduced. By pumping ground water in the observation holes 177 from an upstream side relative the chamber to a downstream side thereof "ground water flow thermal losses" can be further reduced.

Each shaft within any herein depicted arrangement may be sealed close to the roof of the chamber so as to prevent thermal circulation in the shaft. Each shaft may be sealed by means of sealing means 195 for achieving thermal and liquid sealing.

Four control units 119 are schematically illustrated in FIG. 1. A control unit 119 may be a computer, such as a PC. Each control unit 119 is arranged for communication with at least one temperature sensor 115. The temperature sensor 115 may be arranged in the chamber 105, the passage 110 and/or the bore hole 177. The temperature sensor 115 may thus be arranged to measure temperatures of the first fluid 106 at a desired vertical level. The temperature sensor 115 may alternatively be arranged to measure temperature of the second fluid 107 at a desired vertical level. The temperature sensor 115 may alternatively be arranged to measure temperatures of the ground water provided in the bore hole 177 at a desired vertical level. The temperature sensor 115 is arranged to send signals to the control unit 119. The control unit 119 is arranged to receive signals comprising information about temperatures from at least one temperature sensor 115.

The control units 119 and the central control unit 121 are connected to each other via a network 104. The network 104 may comprise wires for communication purposes. Alternatively the network 104 is a wireless network.

The control units 119 may be connected to each other for reciprocal action. A plurality of control units 119 may be controlled by a central control unit 121. According to one embodiment the control units 119 is provided for monitoring data received from a plurality of temperature sensors 115. According to one embodiment only one control unit 119 is provided for monitoring data received from a plurality of temperature sensors 115. According to one embodiment the central control unit 121 is provided for monitoring data received from a plurality of temperature sensors 115.

The at least one control unit 119 is arranged to monitor temperatures at different locations and vertical levels within the arrangement 100 and to display information related to the different temperatures so as to allow an operator to monitor the arrangement 100.

The at least one temperature sensor 115 and the control unit 119 may be provided in any of the embodiments depicted herein, e.g. with reference to FIGS. 2, 3, 4a-d, and 5.

The control unit 119 is arranged to store information received from the at least one temperature sensor 115 in a memory. The control unit 119 thus provides a logging function regarding temperature values being related to different vertical levels within the arrangement 100.

According to one example the central control unit 121 is arranged to control various features of the arrangement on the basis of said measured temperature values. For example the central control unit 121 is arranged to control the fluid communication means 155, 157, 127, 117, so as to set the pipes for extracting and returning the first or second fluid. For example the central control unit 121 is arranged to control various pumps within the arrangement 100, e.g. 145, 158, 168 and 198, so as to regulate fluid flows within the arrangement in a desired way. This may naturally be performed for any embodiment depicted herein.

According to an embodiment of the invention cooling and heating of the first fluid 106 requires an expansion volume corresponding to the maximum temperature span in the chamber 105. The fluid balance of the inlet and outlet of the first fluid 106 will be made from the bottom level of the chamber 105 to an uppermost portion of the passage 110.

To maintain the balance regarding the second fluid 107 of the passage 110 the second fluid 107 will be balanced by extraction/refilling from a suitable level of the passage 110. Advantageously a minimizing of thermal energy losses associated with the first and second fluid is thereby achieved With reference to FIG. 2 there is schematically illustrated an arrangement 200 for storing thermal energy, according to an aspect of the invention. Some elements of the arrangement 200 are depicted in greater detail with reference to FIG. 1.

According to this example arrangement 200 for storing thermal energy a passage 110 and a chamber 205 are provided. One difference between the arrangement 100 depicted with reference to FIG. 1 and the arrangement 200 is that the chamber 205 initially only had one entrance 130 (initial inlet) provided by the passage 110 instead of two entrances 130 and 140 (initial inlets).

A plurality of channels 101 are provided in the arrangement 200 according to the invention. The channels 101 may be drilled by means of a drilling machine.

According to this example arrangement 200, storage of a relatively cold first fluid 106 is desired. Also, according to this example arrangement 200, storage of a relatively cold second fluid 107 is desired. The first fluid 106 is stored in a chamber 205. The second fluid 107 is stored in the passage 110. The first fluid 106 and the second fluid 107 are preferably used for applications including cooling, meaning that e.g. the third fluid communication device 127, is arranged to extract a relatively cold portion of the first fluid 106 and to provide this portion to the third heat exchanger 187, so as to allow cooling of the second consumer unit 192. The third fluid communication device 127 is arranged to return the processed portion of the first fluid 106 to the chamber 205. The processed portion of the first fluid 106 is typically warmer after being processed than when extracted.

The chamber 205 is arranged to hold the first fluid 106 having a temperature of from −5 to 0 (ice) to +4 degrees Celsius. The first fluid 106 may be in a solid phase. Ice is denoted by a reference number 290. In the case ice is provided it is located at an uppermost portion of the chamber 205. Below the ice 290 a stable layer containing water having a temperature of about 0-4 degrees Celsius is provided.

An example where the first fluid is water follows.

According to one example the chamber 205 is arranged to hold water having a temperature being within a range −5 to +15 degrees Celsius. Compared to a heated/cooled sensible water concept according to the arrangement 100 depicted with reference to FIG. 1 the arrangement 200 is providing a similar thermal storage capacity preferably for cooling due to PCM (Phase Change Material) regarding water.

During operation of the arrangement for cooling purposes, water may be extracted from a lower portion of the chamber 205 and returned to an upper portion of the chamber 205 so as to thereby melt eventually provided ice.

According to one embodiment there is provided feeder means for providing ice and/or snow from the ground surface 199 to the chamber 205. According to one example there is provided a motor operated feeder screw 230 for screwing down a suitable amount of ice and/or snow. The feeder means may be arranged in a shaft, such as the third shaft 126, of the arrangement 200. The ice may be provided by an ice machine (not shown).

According to one embodiment there is provided alternative feeder means 240 for providing ice and/or snow from the ground surface 199 to the chamber 205. According to one example there is provided a pump for providing a suitable amount of ice and/or snow via one or more pipes to the chamber. This feeder means 240 is also arranged to extract the first fluid 106 and mix the snow and ice to a slurry and provide the slurry to the chamber 205. This feeder means 240 may also be arranged in a shaft, such as the third shaft 126, of the arrangement 200. The ice may be provided by an ice machine 279.

According to one embodiment there is provided a cooling means (not shown) for cooling the first fluid 106. The cooling means may comprise at least one cooling/freezing loop. Alternatively, the cooling means may comprise at least one refrigerating pipe, substantially being a cold element for reducing the thermal energy of the first fluid 106 when being provided therein. The cooling pipes may be removable held within the first fluid by any suitable means.

According to one example telescopic pipes for extracting water may not be used since a particular vertical level for extraction of the first fluid is of less importance in the arrangement 200, in particular in a case where the temperature interval of the first fluid 106 is within a few degrees Celsius, such as e.g. 4-0 degrees Celsius. The third fluid communication device 127 may be arranged with a fluid extraction pipe being provided at a predetermined vertical level within the chamber 205. Accordingly, the third fluid communication device 127 may be arranged with a fluid return pipe being provided at a predetermined vertical level within the chamber 205, preferably at a bottom of the chamber 205.

According to one example fractions of snow deposits containing snow collected from roads or streets may be provided to the chamber 205 in any suitable manner. To avoid undesired contamination of the first fluid 106 held in the chamber 205 purification procedures may be applied, so as to e.g. reduce a content of gravel or salt content of the snow before introduction to the chamber 205.

Figure 2:
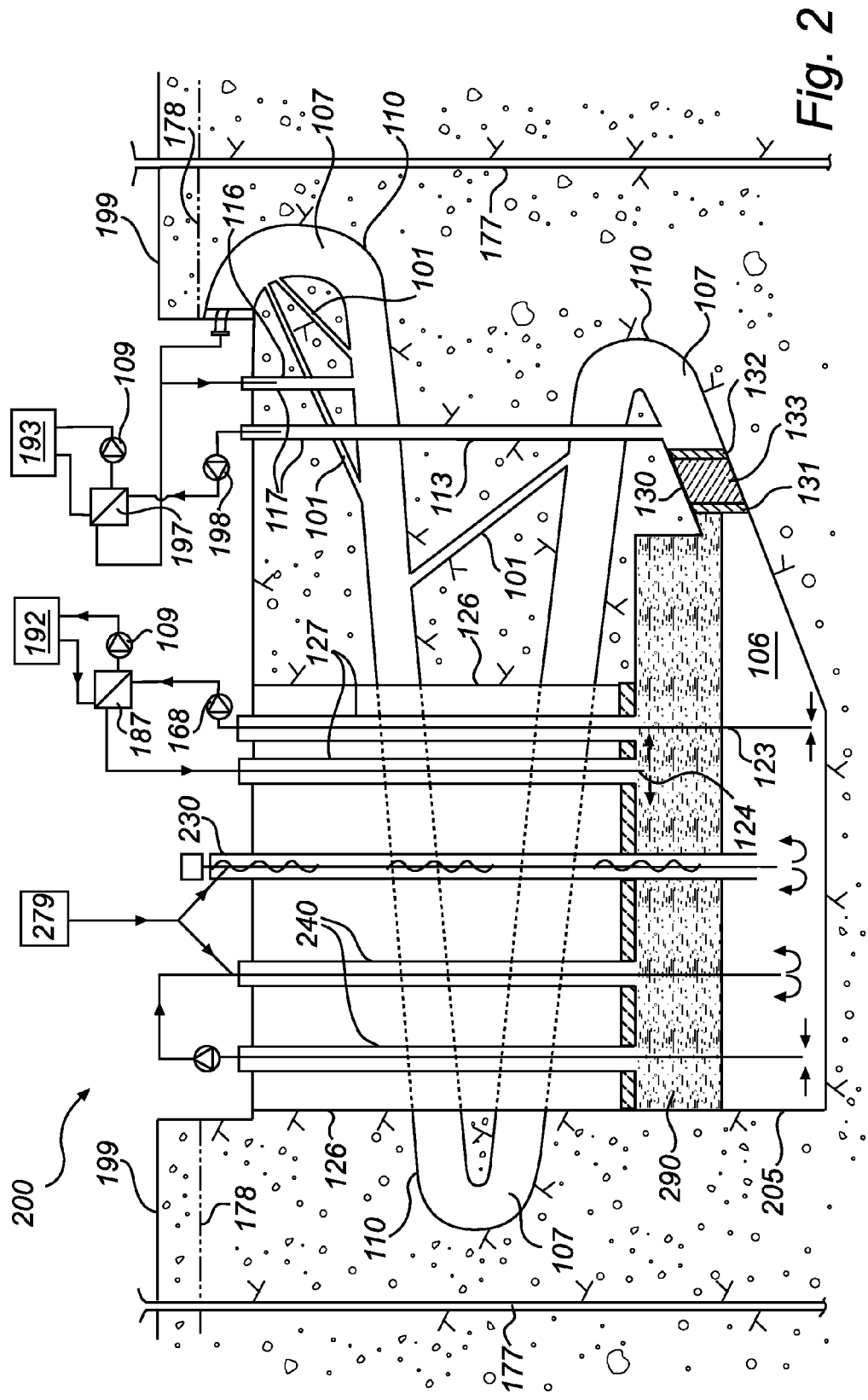
FIG. 2 schematically illustrates an arrangement for storing thermal energy, according to an aspect of the invention.
Figure 3:
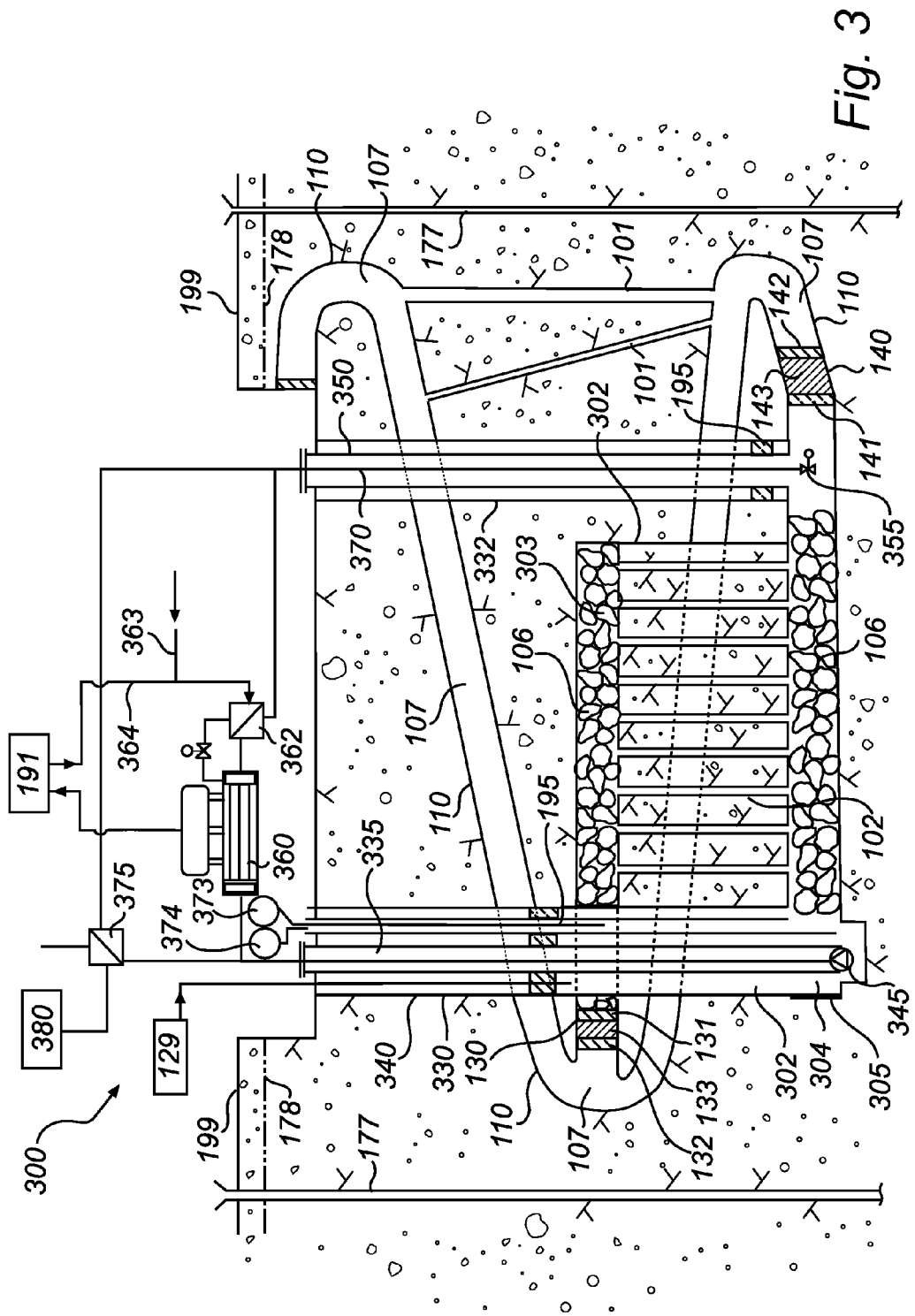
FIG. 3 schematically illustrates an arrangement for storing thermal energy, according to an aspect of the invention.

With reference to FIG. 3 there is schematically illustrated an arrangement 300 for storing thermal energy, according to an aspect of the invention. Some elements of the arrangement 300 are depicted in greater detail with reference to FIG. 1 and/or FIG. 2.

The arrangement 300 comprises a chamber 305 arranged to hold the first fluid 106. The passage 110 is holding the second fluid 107. The ground surface is indicated by reference numeral 199.

A plurality of channels 101, 102 are provided in the arrangement 300 according to the invention. The channels 101, 102 may be drilled by means of a drilling machine.

The chamber 305 is arranged with a first portion 303 arranged to hold some of the first fluid 106. The first fluid 106 provided in the first portion 303 may have a temperature exceeding 100 degrees Celsius. According to one example the temperature of the first fluid 106 of the first portion 303 is within a temperature range 135-175 degrees Celsius. The first portion 303 is also referred to as an upper gallery.

The chamber 305 is arranged with a second portion 304 arranged to hold some of the first fluid 106. The first fluid 106 provided in the second portion 303 may have a temperature exceeding 90 degrees Celsius. According to one example the temperature of the first fluid 106 of the second portion 304 is within a temperature range of 90-180 degrees Celsius. The second portion 304 is also referred to as a lower gallery.

The arrangement 300 differs from the arrangement 100 and 200 depicted above in that an intermediate layer 302 is provided within the chamber 305 for storing the first fluid 106. The intermediate layer 302 may be made of rock. The intermediate layer 302 is also referred to as rock section. A plurality of channels 102 is provided to allow fluid communication of the first fluid 106 between the second portion 304 and the first portion 303. The channels 102 may be drilled through holes between the first portion 303 and the second portion 304. The channels 102 are preferably substantially vertically arranged. An arbitrary number of channels 102 may be provided in the rock section. Each channel 102 may have an arbitrary suitable dimension. According to one example a diameter of the channels is within a range of 10-20 centimeters.

The first portion 303 may be at least partly filled by rock blocks. According to one example the first portion 303 is completely filled by rock blocks. A porosity of the completely filled first portion may be about 30%. According to one example the first portion 303 does not have any block rocks provided therein.

The second portion 304 may be at least partly filled by rock blocks. According to one example the second portion 304 is completely filled by rock blocks. A porosity of the completely filled second portion may be about 30%. According to one example the first portion 303 does not have any block rocks provided therein.

There is provided a shaft 330 between the ground surface 199 and the first portion 303 of the chamber 305. A first casing pipe 340 having a submerged pump 345 for pumping a portion of the first fluid 106 from the first portion 303 via a first pipe 335 to a heat exchanger 375. The pump 345 may be arranged for extraction of the first fluid 106 from different levels. The first pipe 335 is provided within the casing pipe 340. The casing pipe 340 is arranged to pull up the pump 345, e.g. for maintenance.

Alternatively a long shaft pump may be used for pumping the portion of the first fluid 106 from the first portion 303 of the chamber 305 to the heat exchanger 375. The motor of the long shafted pump may be located in a machine room at the surface.

The first fluid 106 is provided to a steam generator 360, which steam generator 360 is arranged to generate steam by means of thermal energy stored in the first fluid 106. The first fluid 106 should be pressurized in the first pipe 335, heat exchanger 175, and steam generator 360 so that the first fluid 106 is in a liquid phase.

There is also provided a second pipe 370 for allowing transport of the first fluid 106 from the steam generator 360 to the second portion 304 of the chamber 305. The first fluid 106 is cooled of to some extent in the steam generator 360. The first fluid 106 is cooled of to some extent in a heat exchanger 362. The heat exchanger 362 is arranged to preheat condensate 364 returning from a consumer unit, such as consumer unit 191 illustrated in grater detail with reference to FIG. 1. Feed water 363 is provided to the returning condensate 364. The first fluid 106 should be pressurized within the arrangement 300 by means of pump 345 during operation thereof.

The second pipe 370 may be provided in a return casing pipe 350, which is located in a second shaft 332. The return casing pipe 350 is provided with a pressure control valve 355 at the bottom of the chamber 305 at inlet 140.

The heat exchanger 375 is connected to an energy source 380, such as a standby power generator. The energy source 380 is arranged to provide thermal energy to the heat exchanger 375, which in turn is arranged to increase thermal energy of the first fluid 106 extracted from the first portion 303 by means of the pump 345 and the first pipe 335.

According to a preferred embodiment the first fluid 106 stored in the chamber 305 is water.

During operation of the arrangement 300 and due to thermal cycles, shear forces at the rock surface of the interior of the chamber 305 might cause scaling of the rock. As the upper 303 and lower 304 galleries according to an example are filled with rock blocks the volume of each gallery might expand and the porosity thereof will be decreased.

According to an embodiment charging of energy will be performed by supplying steam from an external steam generator 129 at the surface 199 to the top of the chamber 305. The supplied steam condensates at exposure to ambient rock surfaces and the first fluid 106 at a lower temperature than the steam vapour pressure. As the ambient rock gradually will be heated to the saturated steam temperature, the vapour cushion will gradually increase. A fully charged chamber will contain steam and heated rock at saturated steam temperature.

According to an embodiment, at discharging of energy the level of the first fluid 106 will gradually increase, exposing the first fluid 106 to heated rock surfaces and generating steam. This can be achieved at constant pressure in the chamber 305. When a minimum steam cushion is reached in the chamber 305, the stream pressure can gradually be reduced allowing for additional steam evaporation, by gradually cooling exposed rock surface. The upper gallery of the chamber 305 will act as a steam dome, separating liquid and steam and to some extent superheat the steam.

According to an example, this operational mode requires an external fluid balance corresponding to the maximum volume of steam in a fully charged chamber 305 and a minimum steam volume/completely fluid filled heat storage. The fluid balance will however be made by use of the pump 345 so as to pump out a portion of the first fluid 106 from the lower gallery 304 to an upper portion of the chamber 105 (see FIG. 1), or vice versa.

In an alternative or complementary operation of the arrangement 300 depicted above a cushion of saturated steam is maintained in the upper gallery 303 of the chamber 305. The first galley 303 may be filled with saturated steam at a temperature corresponding to the pressure in the chamber 305. A vertical level of the first fluid 106 may be adjusted by controlling an inlet or outlet flow of the steam. The arrangement 300 may be provided with at least one fluid level sensor 373 being arranged to detect the vertical level of the first fluid 106. The fluid level sensor 373 may be connected to the network 104 depicted with reference to FIG. 1. Data generated by the fluid level sensor 373 may be processed by any of the control units 119 or the central control unit 121 depicted with reference to FIG. 1 so as to allow control of any relevant feature of the arrangement, such as the pump 345 and the valve 355.

The arrangement 300 may be provided with at least one fluid pressure sensor 374 being arranged to detect the pressure of the first fluid 106 within the chamber 305. The fluid pressure sensor 374 may be connected to the network 104 depicted with reference to FIG. 1. Data generated by the fluid pressure sensor 374 may be processed by any of the control units 119 or the central control unit 121 depicted with reference to FIG. 1 so as to allow control of any relevant feature of the arrangement 300, such as the pump 345 and the valve 355.

The arrangement 300 may be controlled on the basis of data detected by the fluid level sensor 373 and the fluid pressure sensor 374 so as to regulate pressure of the steam provided in the chamber 305 and vertical level of the first fluid 106 in the chamber 305.

The at least one fluid level sensor 373 and the at least one fluid pressure sensor 374 may be integrated in any of the embodiments depicted herein, e.g. with reference to FIGS. 1, 2, 3, 4a-d and 5

According to an example, operation pressure of the first fluid 106 is maximum 100 bar.

It is with reference to FIGS. 4a-d below depicted various configurations of the inventive arrangement are illustrated. It should be noted that the embodiments illustrated are for illustrative purposes. Naturally any suitable combination of shafts, fluid communication means, heat exchangers, energy sources, consumer units etc may be implemented. It should also be noted that any desired number of channels 102 may be arranged in the arrangements illustrated to allow fluid communication of said first fluid between different sections of a chamber. It should also be noted that any desired number of channels 101 may be arranged to allow fluid communication of said second fluid between different sections of the passage 110.

Figure 4A:
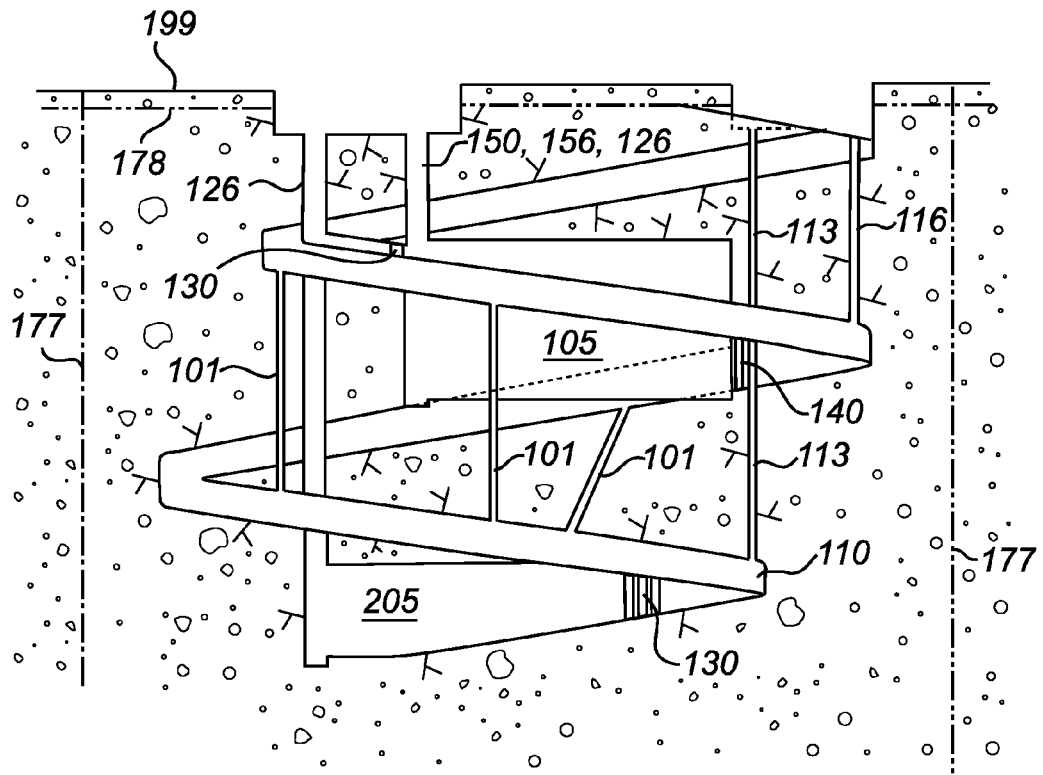
FIG. 4*a-d* schematically illustrates different arrangements for storing thermal energy, according to various aspects of the invention.

With reference to FIG. 4a there is schematically illustrated an arrangement for storing thermal energy, according to an aspect of the invention.

The arrangement for storing thermal energy comprises a first chamber 105 and a second chamber 205. The first chamber 105 is depicted in greater detail with reference to FIG. 1. The second chamber 205 is depicted with greater detail with reference to FIG. 2. The first chamber 105 and the second chamber are arranged in a vertical configuration relative each other.

It is illustrated that the passage 110 is extended outside the first chamber 105 and the second chamber 205. The first chamber 105 and the second chamber 205 are substantially not in fluid communication with each other. According to this configuration of the arrangement for storing thermal energy the first chamber 105 is provided above the second chamber 205.

Bore holes 177, also referred to ground water control units, are provided adjacent the first 105 and second 205 chambers. The shafts 113, 116, 126, 150, and 156 are illustrated. Ground surface 199 and ground water level 178 are illustrated.

According to an alternative configuration of the arrangement for storing thermal energy the chamber 305 depicted with reference to FIG. 3 is arranged above the chamber 105 depicted with reference to FIG. 1.

According to an alternative configuration of the arrangement for storing thermal energy the chamber 305 depicted with reference to FIG. 3 is arranged above the chamber 205 depicted with reference to FIG. 2.

According to an alternative configuration of the arrangement for storing thermal energy the chamber 105 depicted with reference to FIG. 1 is arranged above yet another chamber 105 depicted with reference to FIG. 1.

According to an alternative configuration of the arrangement for storing thermal energy the chamber 205 depicted with reference to FIG. 2 is arranged above yet another chamber 205 depicted with reference to FIG. 2.

According to an alternative configuration of the arrangement for storing thermal energy the chamber 305 depicted with reference to FIG. 3 is arranged above yet another chamber 305 depicted with reference to FIG. 3.

According to an alternative configuration of the arrangement for storing thermal energy the chamber 205 depicted with reference to FIG. 2 is arranged under the chamber 105 depicted with reference to FIG. 1.

Figure 4B:
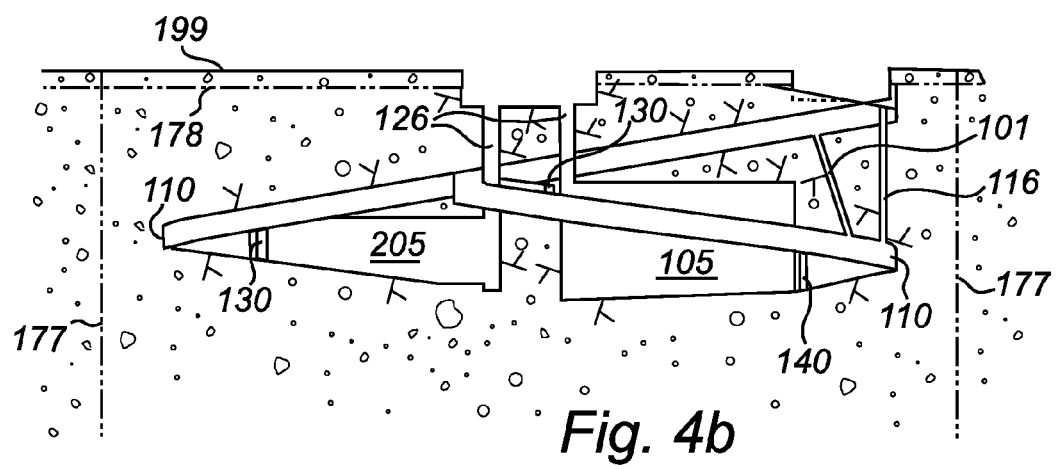

With reference to FIG. 4b there is schematically illustrated an arrangement for storing thermal energy, according to an aspect of the invention.

The arrangement comprises a first chamber 105 and a second chamber 205. The first chamber 105 is depicted in greater detail with reference to FIG. 1. The second chamber 205 is depicted with greater detail with reference to FIG. 2. The first chamber 105 and the second chamber are arranged in a horizontal configuration.

It is illustrated that the passage 110 is extended outside the first chamber 105 and the second chamber 205. The first chamber 105 and the second chamber are substantially not in fluid communication with each other.

According to this configuration of the arrangement for storing thermal energy the first chamber 105 is adjacent the second chamber 205.

According to an alternative configuration of the arrangement for storing thermal energy the chamber 305 depicted with reference to FIG. 3 is arranged adjacent the chamber 105 depicted with reference to FIG. 1.

According to an alternative configuration of the arrangement for storing thermal energy the chamber 305 depicted with reference to FIG. 3 is arranged adjacent the chamber 205 depicted with reference to FIG. 2.

According to an alternative configuration of the arrangement for storing thermal energy the chamber 105 depicted with reference to FIG. 1 is arranged adjacent yet another chamber 105 depicted with reference to FIG. 1.

According to an alternative configuration of the arrangement for storing thermal energy the chamber 205 depicted with reference to FIG. 2 is arranged adjacent yet another chamber 205 depicted with reference to FIG. 2.

According to an alternative configuration of the arrangement for storing thermal energy the chamber 305 depicted with reference to FIG. 3 is arranged adjacent yet another chamber 305 depicted with reference to FIG. 3.

Bore holes 177, also referred to ground water control units, are provided adjacent the first 105 and second 205 chambers. The shafts 116, 126, 150, and 156 are illustrated. Ground surface 199 and ground water level 178 are illustrated.

Figure 4C:
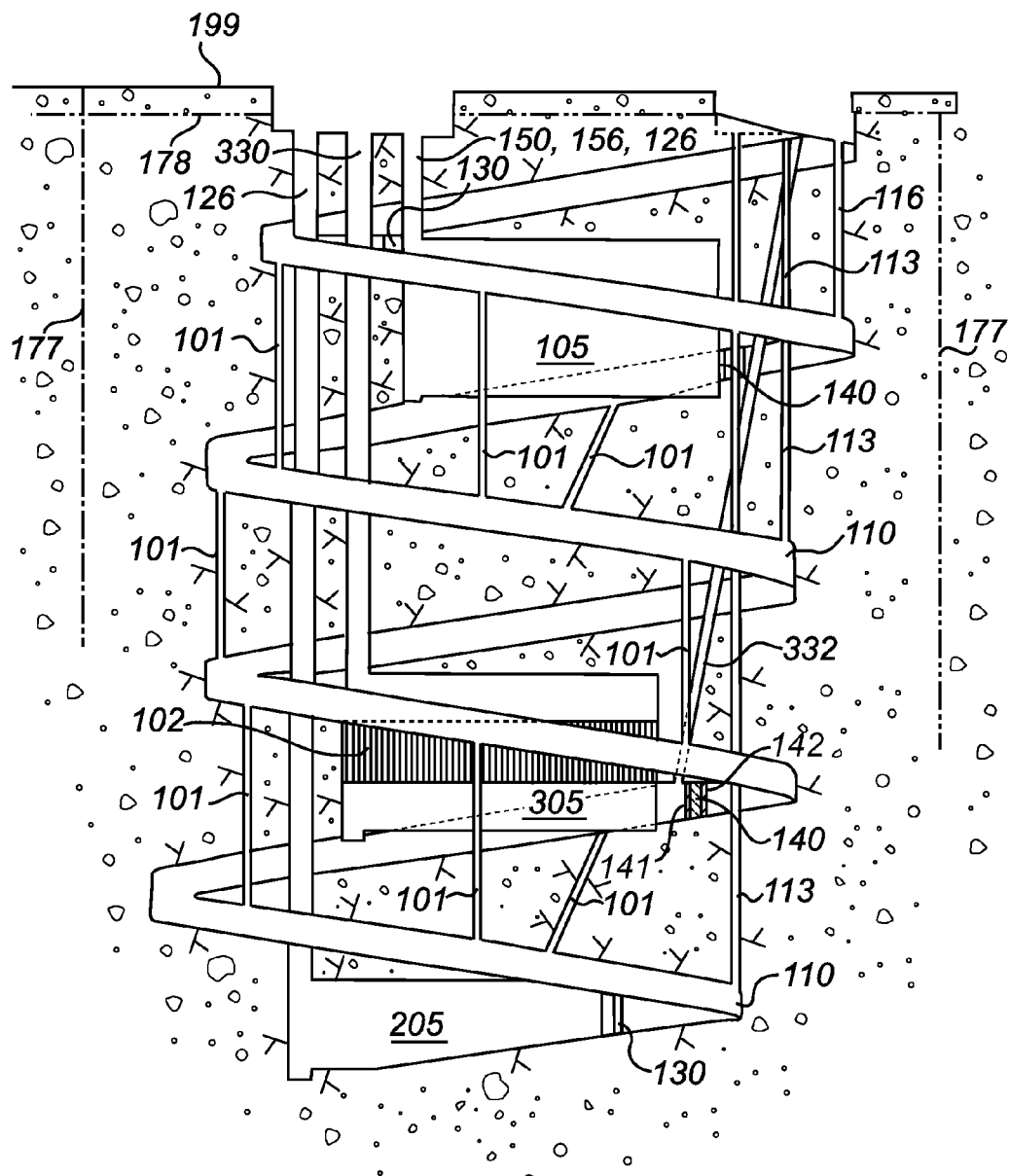

With reference to FIG. 4c there is schematically illustrated an arrangement for storing thermal energy, according to an aspect of the invention.

The arrangement for storing thermal energy comprises three chambers, namely the first chamber 105, the second chamber 205 and a third chamber 305. The first chamber 105 is depicted in greater detail with reference to FIG. 1. The second chamber 205 is depicted with greater detail with reference to FIG. 2. The third chamber 305 is depicted with greater detail with reference to FIG. 3.

The first chamber 105, the second chamber 205 and the third chamber 305 are arranged in a vertical configuration as illustrated in FIG. 4c.

It is illustrated that the passage 110 is extended outside the first chamber 105, the second chamber 205 and the third chamber 305. The first chamber 105, the second chamber 205 and the third chamber 305 are substantially not in fluid communication with each other.

Any suitable combination of the first chamber 105, the second chamber 205 and the third chamber 305 may be realized.

According to a preferred configuration of the arrangement for storing thermal energy the third module 305 is provided at an uppermost position, and the first chamber 105 is provided at an intermediate position between the second chamber 205 and the third chamber 305.

Bore holes 177, also referred to ground water control units, are provided adjacent the first 105, second 205 and third 305 chambers. The shafts 113, 116, 126, 150, and 156 are illustrated. Ground surface 199 and ground water level 178 are illustrated.

Figure 4D:
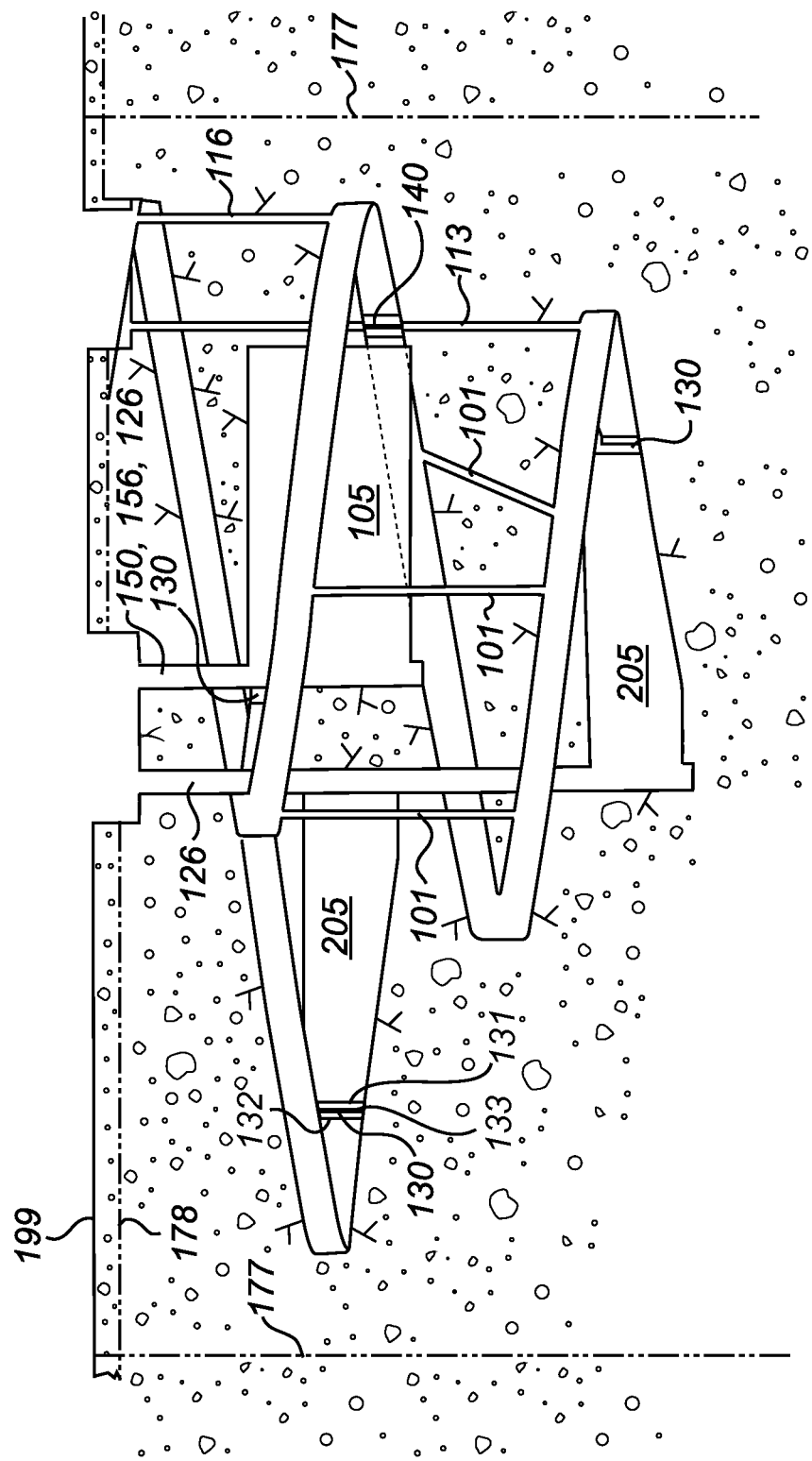

With reference to FIG. 4d there is schematically illustrated an arrangement for storing thermal energy, according to an aspect of the invention.

According to this configuration of the arrangement for storing thermal energy the arrangement comprises the first chamber 105 and the third chamber 305. The first chamber 105 and the third chamber 305 are arranged horizontally relative each other and the second chamber 205 is arranged under the first chamber 105 and the third chamber 305.

It is illustrated that the passage 110 is extended outside the first chamber 105, the second chamber 205 and the third chamber 305. The first chamber 105, the second chamber 205 and the third chamber are substantially not in fluid communication with each other.

According to an embodiment of the invention each pressure within different chambers may be independently controlled. In particular this is desired in a case where the chambers each contain mutually different kinds of the first fluid 106, such as oil, water and propane. Each pressure may be controlled via suitable means such as a pressure device in combination with a valve arranged in a shaft associated with the chamber.

According to an embodiment of the invention the pressure of the first fluid 106 and the second fluid 107 may be independently controlled. In particular this is desired in a case where the first fluid 106 and the second fluid 107 each comprises mutually different kinds of fluids, such as oil and water. Each pressure of the first fluid 106 and the second fluid 107 may be controlled via suitable means such as a pressure device in combination with a valve suitable arranged.

According to an embodiment of the invention the pressure of the second fluid 107 and the surrounding ground water may be independently controlled. Each pressure of the second fluid 107 and the surrounding ground water may be controlled via suitable means such as fluid level control means for controlling the level of the ground water.

Bore holes 177, also referred to ground water control units, are provided adjacent the first 105 and second 205 chambers. The shafts 116, 126, 150, and 156 are illustrated. Ground surface 199 and ground water level 178 are illustrated.

Figure 5:
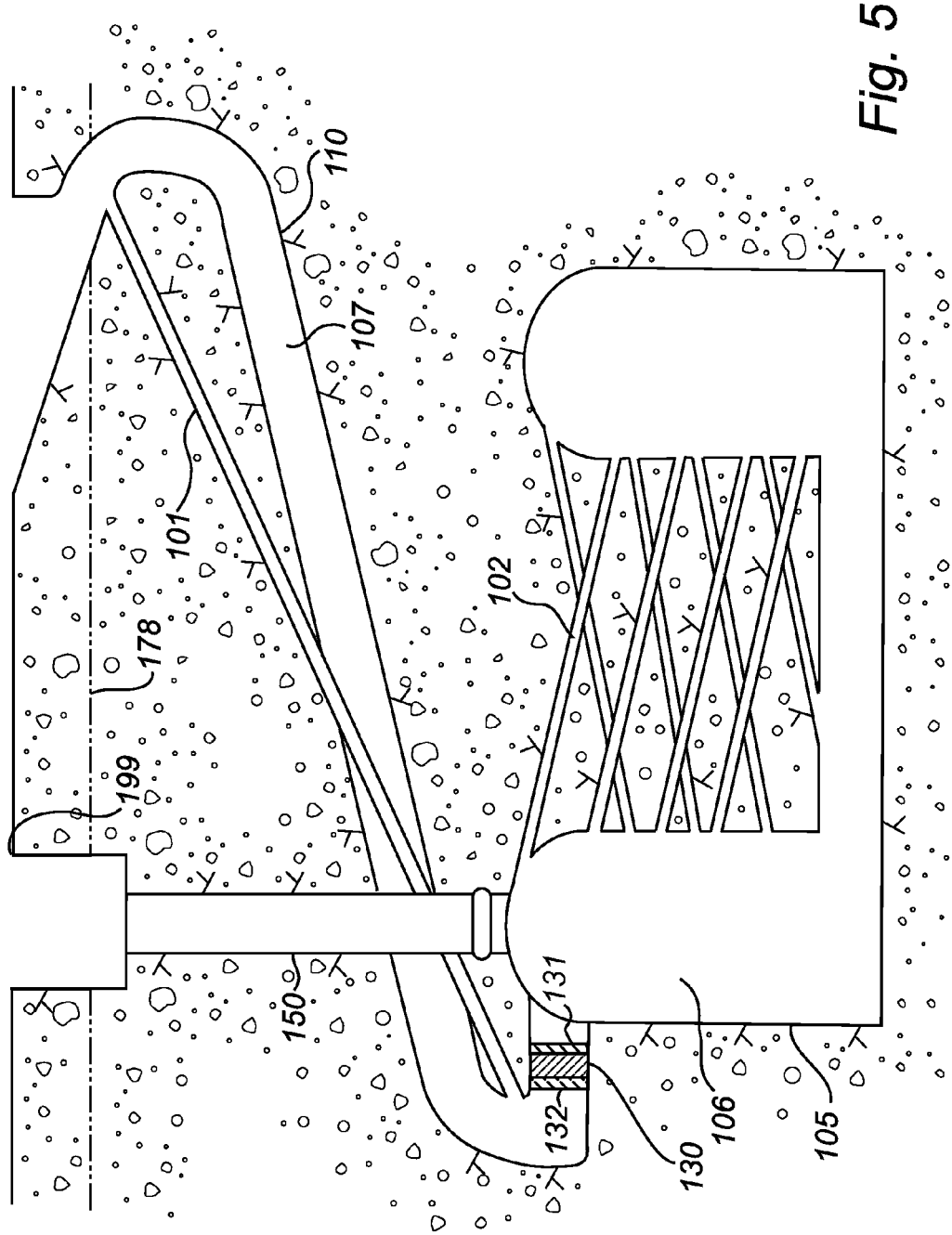
FIG. 5 schematically illustrates a side view of an arrangement for storing thermal energy, according to an aspect of the invention.

With reference to FIG. 5 there is schematically illustrated a cross sectional view of a chamber 105 of the arrangement 100 for storing thermal energy, according to an aspect of the invention. Alternatively the chamber 205 of the arrangement 200 or the chamber 305 of the arrangement 300 may be used to exemplify the set up according to FIG. 5.

According to this example the chamber 105 has a form allowing at least one channel 102 to be provided between different sections of the chamber 105. The at least one channel 102 may be a plurality of channels 102. The channels 102 are arranged to allow fluid communication of said first fluid 106 between different sections of the chamber 105.

Figure 6:
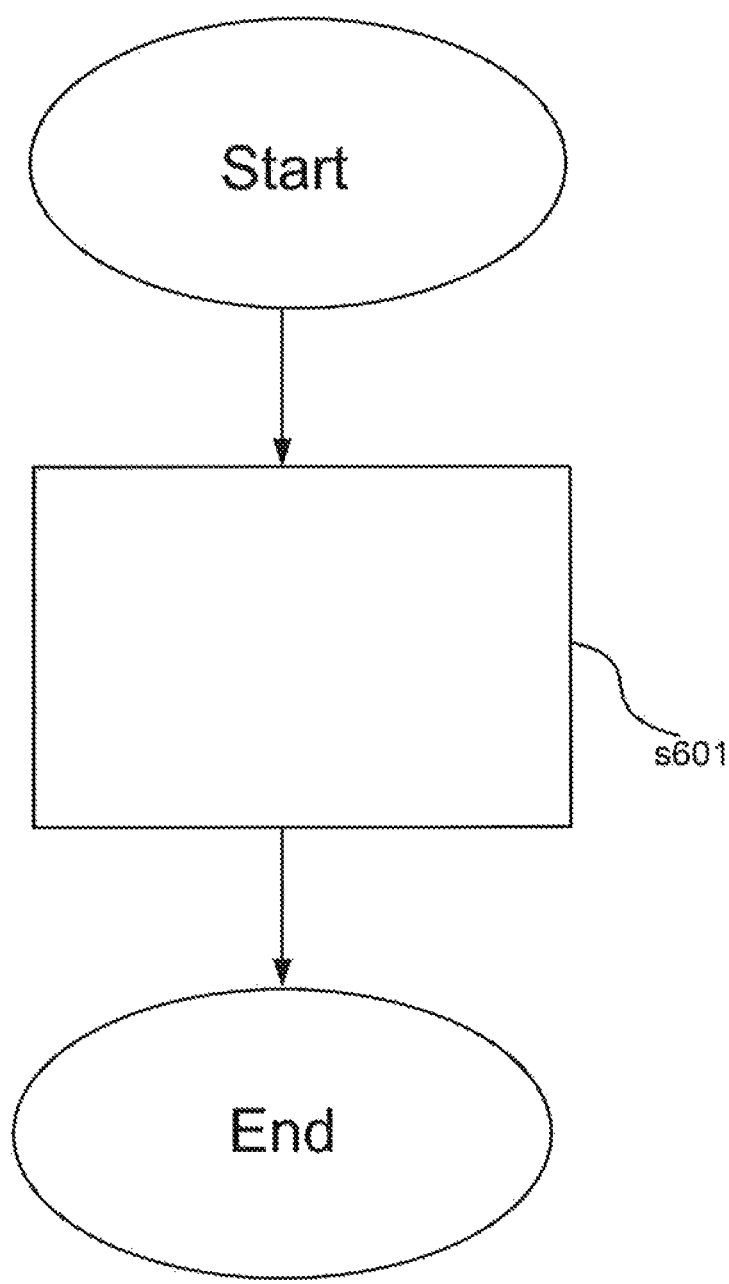
FIG. 6 schematically illustrates a flow chart depicting a method for improving an arrangement for storing thermal energy, according to an aspect of the invention.

With reference to FIG. 6 there is schematically illustrated a flow chart depicting a method for improving an arrangement for storing thermal energy, wherein said arrangement comprises at least one subterranean chamber for holding a first fluid, wherein a passage holding a second fluid is extended outside at least a part of said at least one chamber, according to an aspect of the invention.

The method comprises a first method step s601. The first method step s601 comprises the steps of providing at least one channel to allow fluid communication of said first fluid between different sections of said chamber; and/or providing at least one channel to allow fluid communication of said second fluid between different sections of the passage separated in height. After the method step s601 the method ends.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. An arrangement for storing thermal energy, comprising:
   a subterranean passage having a passage wall, the subterranean passage and the passage wall being formed out of an existing subterranean medium, the subterranean passage comprising a plurality of sections, the subterranean passage having a fluid therein, wherein at least one of the plurality of sections is curved and wherein said subterranean passage is configured as a helix;
   a channel having a cross-sectional area smaller than a cross-sectional area of the subterranean passage, the channel being formed out of the subterranean medium and extending from a first opening formed in the passage wall of one of the plurality of passage sections to a second opening formed in the passage wall of another of the plurality of passage sections such that a fluid connection is created between the passage sections;
   a fluid communication device including a first pipe arranged to extract a portion of the fluid from the subterranean passage, a pump fluidly connected to the first pipe, and a second pipe arranged to return the portion of the fluid to the subterranean passage; and
   a heat exchanger positioned above the subterranean medium and fluidly connected to the pump of the fluid communication device to receive the portion of the fluid extracted by the first pipe of the fluid communication device from the subterranean passage, perform a heat transfer process on the portion of the fluid, and fluidly connected to the second pipe of the fluid communication device to return the portion of the fluid to the second pipe for return to the subterranean passage,
   wherein the first opening and the second opening are located at different elevations of the subterranean passage such that the channel allows natural thermal convection between the passage sections that are connected by the fluid connection.

2. The arrangement according to claim 1, further comprising a pump separate from the pump of the fluid communication device and fluidly connected to the heat exchanger and configured to pump a fluid from the heat exchanger.

3. The arrangement according to claim 1, wherein the fluid communication device is configured to extract the portion of the fluid at a first location, deliver the extracted portion of the fluid to the heat exchanger for heating, receive the fluid from the heat exchanger, and deliver the extracted portion of the fluid to the subterranean passage at a second location.

4. The arrangement according to claim 1, wherein the plurality of sections of the subterranean passage hold the fluid and are vertically spaced from one another to form a helix or spiral, and wherein the fluid held by the plurality of sections has varying temperatures at different locations.

5. An arrangement for storing thermal energy, comprising:
   a subterranean passage having a passage wall, the subterranean passage and the passage wall being formed out of an existing subterranean medium, the subterranean passage comprising a plurality of sections, the subterranean passage having a fluid therein, wherein at least one of the plurality of sections is curved;
   a channel having a cross-sectional area smaller than a cross-sectional area of the subterranean passage, the channel being formed out of the subterranean medium and extending from a first opening formed in the passage wall of one of the plurality of passage sections to a second opening formed in the passage wall of another of the plurality of passage sections such that a fluid connection is created between the passage sections;
   a fluid communication device including a first pipe arranged to extract a portion of the fluid from the subterranean passage, a pump fluidly connected to the first pipe, and a second pipe arranged to return the portion of the fluid to the subterranean passage;
   a heat exchanger positioned above the subterranean medium and fluidly connected to the pump of the fluid communication device to receive the portion of the fluid extracted by the first pipe of the fluid communication device from the subterranean passage, perform a heat transfer process on the portion of the fluid, and fluidly connected to the second pipe of the fluid communication device to return the portion of the fluid to the second pipe fluid communication device for return to the subterranean passage,
   wherein the first opening and the second opening are located at different elevations of the subterranean passage such that the channel allows natural thermal convection between the passage sections that are connected by the fluid connection-first passage section and the second passage section; and,
   at least one subterranean chamber formed in the subterranean medium, wherein the subterranean passage extends around at least a portion of the at least one subterranean chamber and wherein the at least one subterranean chamber includes a chamber wall formed in the subterranean medium, the at least one subterranean chamber further comprising a first chamber section and a second chamber section.

6. The arrangement according to claim 5, wherein said second channel is a plurality of channels.

7. The arrangement according to claim 5, wherein the fluid in the subterranean passage is a first fluid, and wherein a second fluid is arranged in the chamber.

8. The arrangement according to claim 7, wherein one of the first fluid and the second fluid is chosen from the group consisting of: water, a mixture of water and a coolant, any liquid fuels, hydro carbons of fossil origin or biological origin, salt solution, ammonia and other refrigerants.

9. The arrangement according to claim 7, further comprising another heat exchanger and at least one additional fluid communication device separate from the fluid communication device and configured to extract a portion of said second fluid from the at least one subterranean chamber at a first height within the at least one subterranean chamber so as to allow processing of said second fluid via the another heat exchanger, wherein said additional fluid communication device further is arranged to return the processed second fluid to the at least one subterranean chamber at a second height within the at least one subterranean chamber.

10. The arrangement according to claim 9, further comprising an energy source coupled to said another heat exchanger, wherein the another heat exchanger is arranged to increase the thermal energy of the second fluid.

11. The arrangement according to claim 10, wherein said energy source is one or more of a group of energy sources consisting of: a thermal electrical power arrangement for heating and/or cogeneration of electricity and heat, an emergency electricity generator, solar panels for heating or solar panels for combined electrical generation and heating, bio fuel heater, oilfired boiler, or a boiler powered by fossil fuel or bio fuel.

12. The arrangement according to claim 5, wherein the at least one subterranean chamber is a first chamber and a second chamber being separated and vertically arranged relative each other.

13. The arrangement according to claim 12, wherein said passage extends around at least a portion of the first or the second chamber.

14. An arrangement for storing thermal energy, comprising:
a subterranean chamber having a chamber wall formed out of a subterranean medium, the subterranean chamber having a first chamber section and a second chamber section;
a channel formed in the subterranean medium and extending from a first opening formed in the chamber wall of the first chamber section to a second opening formed in the chamber wall of the second chamber section such that a fluid connection is created between the first chamber section and the second chamber section;
a fluid communication device including a first pipe arranged to extract a portion of a fluid from the subterranean chamber, a pump fluidly connected to the first pipe, and a second pipe arranged to return the portion of the fluid to the subterranean chamber; and
a heat exchanger positioned above the subterranean medium and fluidly connected to the pump of the fluid communication device to receive the portion of the fluid extracted by the first pipe of the fluid communication device from the subterranean chamber, perform a heat transfer process on the portion of the fluid, and fluidly connected to the second pipe of the fluid communication device to return the portion of the fluid to the second pipe for return to the subterranean chamber,
wherein the first opening and the second opening are located at different elevations of the subterranean chamber such that the channel allows natural thermal convection between the first chamber section and the second chamber section, the arrangement further comprising a pump separate from the pump of the fluid communication device and fluidly connected to the heat exchanger and configured to pump a fluid from the heat exchanger.

15. The arrangement according to claim 14, wherein said channel includes a plurality of channels.

16. The arrangement according to claim 14, wherein the fluid is a first fluid is chosen from the group consisting of: water, a mixture of water and a coolant, any liquid fuels, hydro carbons of fossil origin or biological origin, salt solution, ammonia or other refrigerants.

17. The arrangement according to claim 14, wherein the fluid communication device is arranged to extract a portion of said first fluid from the subterranean chamber at a first height within the subterranean chamber so as to allow processing of said first fluid via the heat exchanger, wherein said fluid communication device further is arranged to return the processed first fluid to the subterranean chamber at a second height within the subterranean chamber.

18. The arrangement according to claim 17, further comprising an energy source coupled to said heat exchanger, wherein the heat exchanger is arranged to increase the thermal energy of the first fluid.

19. The arrangement according to claim 18, wherein said energy source is one or more of a group of energy sources consisting of: a thermal electrical power arrangement for heating and/or cogeneration of electricity and heat, an emergency electricity generator, solar panels for heating or solar panels for combined electrical generation and heating, bio fuel heater, oil fired boiler, or a boiler powered by fossil fuel or bio fuel.

20. The arrangement according to claim 14, wherein the subterranean chamber is a first subterranean chamber, the arrangement further comprising a second subterranean chamber separated and vertically arranged relative to the first subterranean chamber.

* * * * *

UNITED STATES PATENT AND TRADEMARK OFFICE
CERTIFICATE OF CORRECTION

PATENT NO. : 9,709,337 B2  
APPLICATION NO. : 13/388648  
DATED : July 18, 2017  
INVENTOR(S) : Hans Pilebro et al.

It is certified that error appears in the above-identified patent and that said Letters Patent is hereby corrected as shown below:

On the Title Page

Item (73) Assignee should read:  
Skanska Sverige AB  
Stockholm  
SWEDEN

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*